United States Patent
Samet

(10) Patent No.: US 9,405,967 B2
(45) Date of Patent: Aug. 2, 2016

(54) IMAGE PROCESSING APPARATUS FOR FACIAL RECOGNITION

(71) Applicant: Samet Privacy, LLC, Los Angeles, CA (US)

(72) Inventor: Shai Samet, Los Angeles, CA (US)

(73) Assignee: Samet Privacy LLC, Los Angeles, CA (US)

( * ) Notice: Subject to any disclaimer, the term of this patent is extended or adjusted under 35 U.S.C. 154(b) by 0 days.

(21) Appl. No.: 14/826,960

(22) Filed: Aug. 14, 2015

(65) Prior Publication Data

US 2016/0063314 A1     Mar. 3, 2016

Related U.S. Application Data

(63) Continuation of application No. PCT/US2015/045317, filed on Aug. 14, 2015.

(60) Provisional application No. 62/045,140, filed on Sep. 3, 2014.

(51) Int. Cl.
```
G06K 9/00      (2006.01)
G06F 21/32     (2013.01)
G06F 21/30     (2013.01)
G06F 21/31     (2013.01)
G06F 21/44     (2013.01)
```
(52) U.S. Cl.
CPC ............ *G06K 9/00288* (2013.01); *G06F 21/30* (2013.01); *G06F 21/31* (2013.01); *G06F 21/32* (2013.01); *G06F 21/44* (2013.01); *G06K 9/0061* (2013.01); *G06K 9/00221* (2013.01); *G06K 9/00268* (2013.01); *G06K 9/00899* (2013.01); *G06K 9/00906* (2013.01); *G06K 9/00315* (2013.01); *G06K 2009/00322* (2013.01)

(58) Field of Classification Search
USPC .......... 382/100, 115–118, 159, 160, 224, 325
See application file for complete search history.

(56) References Cited

U.S. PATENT DOCUMENTS

| | | | | |
|---|---|---|---|---|
| 8,437,513 | B1 * | 5/2013 | Derakhshani | G06K 9/00906 382/115 |
| 8,970,348 | B1 * | 3/2015 | Evans | G06K 9/00 340/5.52 |
| 2006/0045352 | A1 * | 3/2006 | Gallagher | G06K 9/0061 382/224 |
| 2010/0077421 | A1 * | 3/2010 | Cohen | G07C 9/00158 382/224 |
| 2010/0115114 | A1 | 5/2010 | Headley | |

(Continued)

OTHER PUBLICATIONS

Young Ho Kwon and Niels da Vitoria Lobo, "Age Classification from Facial Images", IEEE, Proceedings of Conference on Computer Vision and Pattern Recognition, 1994, pp. 767-767.*

(Continued)

*Primary Examiner* — Eric Rush
(74) *Attorney, Agent, or Firm* — Andrew D. Bochner

(57) ABSTRACT

An apparatus including an image capture device including a lens, a shutter, an image sensor, and an aperture is provided. The image capture device receives, via the lens, a plurality of images. The apparatus further includes a display, a memory, a receiver, a transmitter, and a processor. The receiver receives facial recognition data. The transmitter transmits an instruction to capture a series of images via the image capture device. The series of images may include a randomly generated pose. The apparatus further includes a processor to analyze the facial recognition data to determine an estimated age of a user.

19 Claims, 26 Drawing Sheets

(56) References Cited

U.S. PATENT DOCUMENTS

| | | | |
|---|---|---|---|
| 2012/0106805 A1* | 5/2012 | Shuster | G06K 9/00912 |
| | | | 382/115 |
| 2012/0321144 A1* | 12/2012 | Choong | G06K 9/00221 |
| | | | 382/118 |
| 2013/0015946 A1* | 1/2013 | Lau | G06K 9/00228 |
| | | | 382/118 |
| 2013/0044920 A1 | 2/2013 | Langley et al. | |
| 2013/0227651 A1* | 8/2013 | Schultz | G06F 21/32 |
| | | | 726/4 |
| 2014/0282272 A1* | 9/2014 | Kies | G06F 3/017 |
| | | | 715/863 |
| 2015/0154392 A1* | 6/2015 | Bao | G06F 21/32 |
| | | | 726/19 |
| 2015/0254444 A1* | 9/2015 | Herger | G06F 21/32 |
| | | | 726/19 |

OTHER PUBLICATIONS

A PCT International Search Report and Written Opinion of the International Searching Authority, dated Dec. 10, 2015.

* cited by examiner

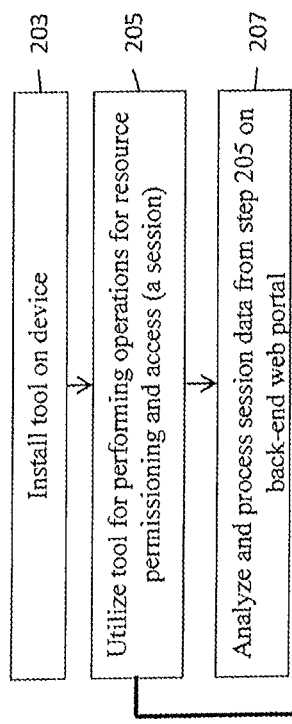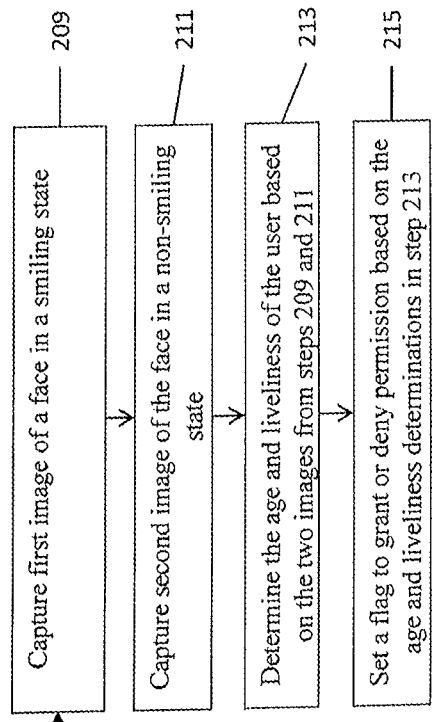
FIG. 2A
FIG. 2B

Install tool on device

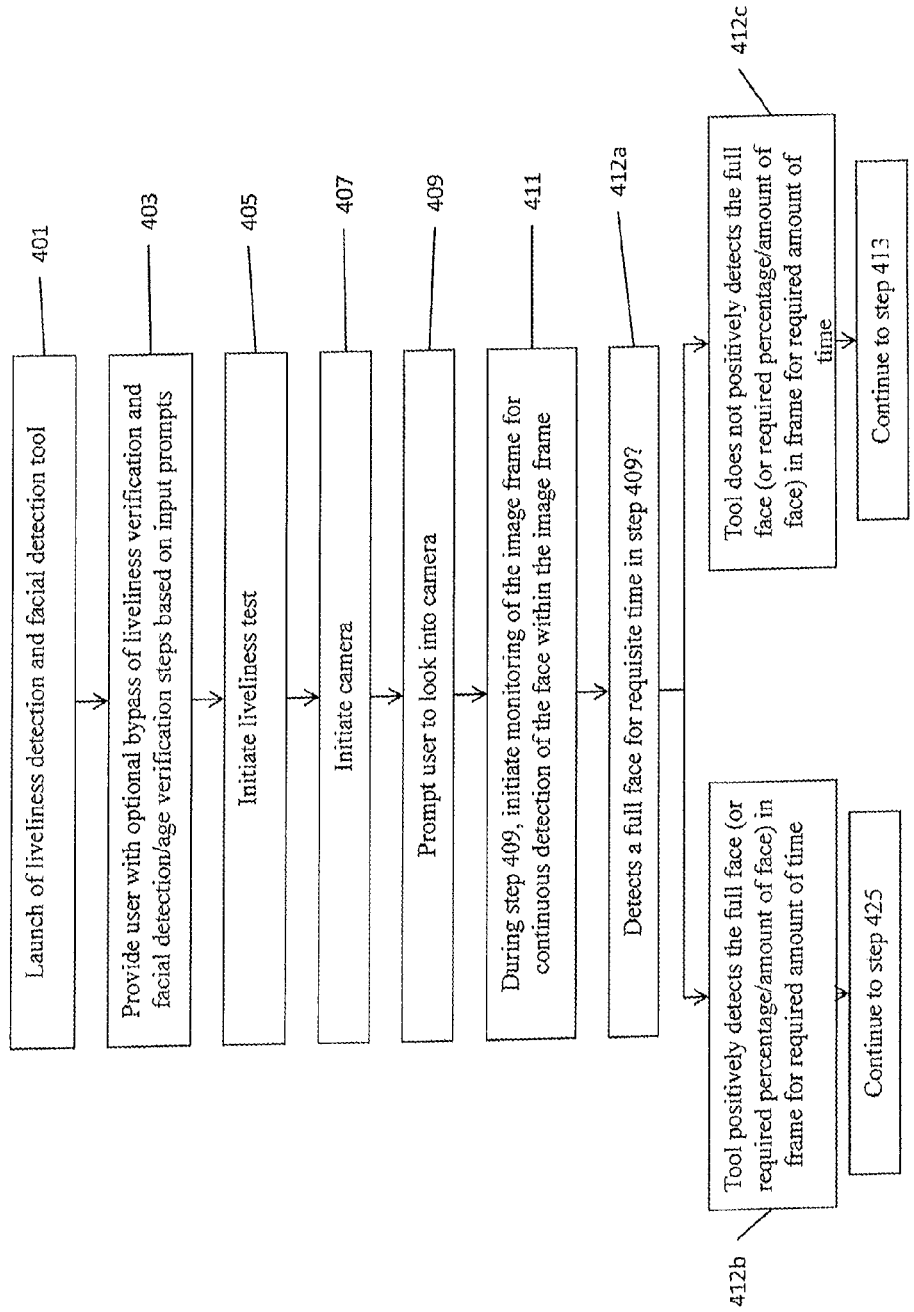

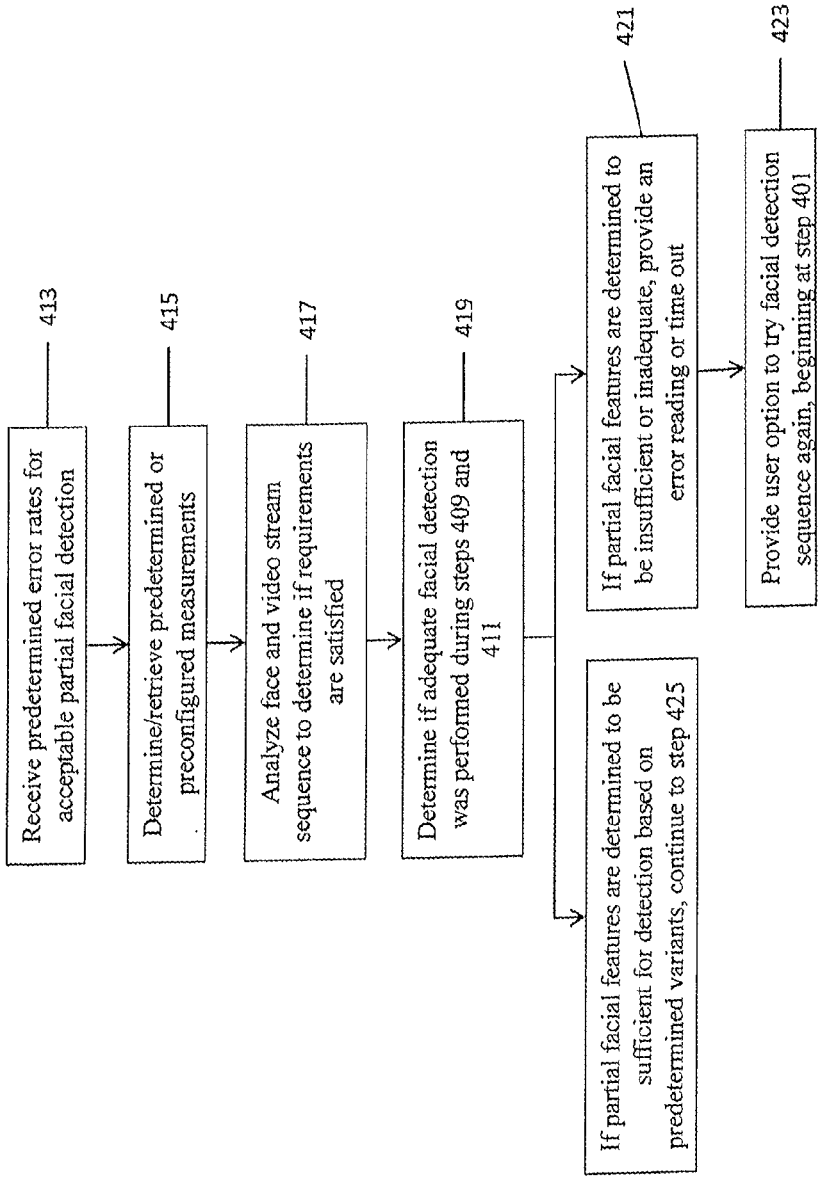

Liveliness Detection – Determining Proper Pose

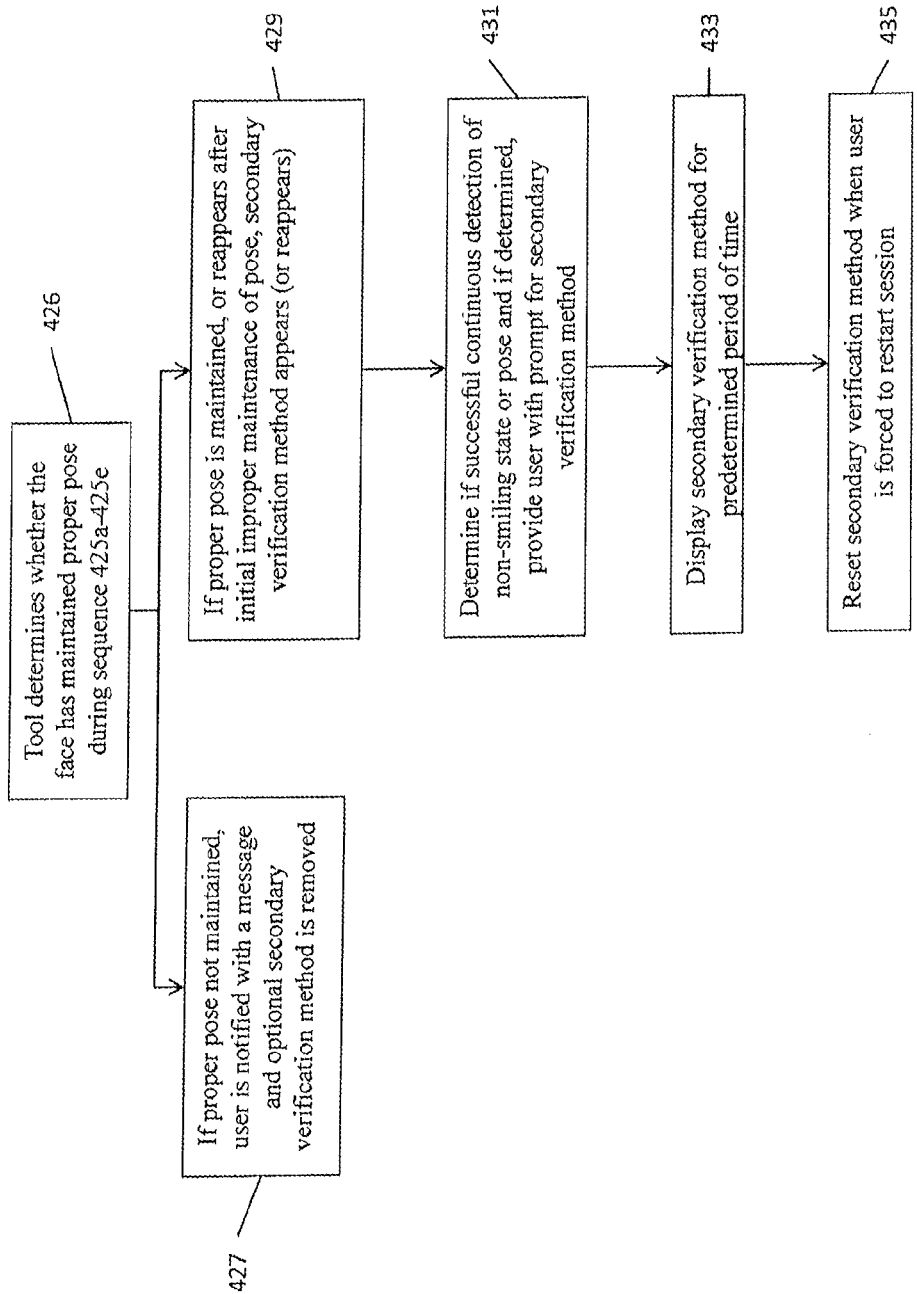

kidSAFE® SEAL PROGRAM

| Home | VeriCam Sessions | Stats | Setup |

VeriCam Sessions

1001 — Client Name ▼ [    ] [Search] ← 1003

Page: [1▼] Results per Page: [50▼]

1005 — Time Period: [    ▼]   1007

1009 — Expand to Full View: ☐

| Client Name (1013) | App Name/ID (1015) | App Type (1017) | Date Created (1019) | Session ID (1021) |
|---|---|---|---|---|
| Demo Client | Demo App (1) | iOS | 06/01/2015 1:24 PM | E6ADB888-E392-4464-B540-6BCF50361656-1433186657314.93 |
| Demo Client | Demo App (1) | iOS | 05/30/2015 10:48 PM | D17B85B1-3812-49C4-A964-C16BC148CA62-1432943283525.73 |
| Demo Client | Demo App (1) | iOS | 05/29/2015 4:13 PM | E6ADB888-E392-4464-B540-6BCF50361656-1432937297758.39 |
| Demo Client | Demo App (1) | iOS | 05/29/2015 4:08 PM | E6ADB888-E392-4464-B540-6BCF50361656-1432937259832.14 |
| Demo Client | Demo App (1) | iOS | 05/28/2015 6:51 PM | E6ADB888-E392-4464-B540-6BCF50361656-1432849950830.14 |
| Demo Client | Demo App (1) | iOS | 05/28/2015 12:04 PM | E6ADB888-E392-4464-B540-6BCF50361656-1432836187017.76 |

(1011)

FIG. 10 kidSAFE®
SEAL PROGRAM

| Home | VeriCam Sessions | Stats | Setup |

Edit Demo App

App Name: [Demo App]
Client Name: [Demo Client ▼]
App Type: [iOS ▼]
1225 — ▶Threshold Age: [18]
1227 — ▶Error Range/Margin: [7]
1229 — ▶Passed Image Retention Period: [Permanent ▼]
1231 — ▶Failed Image Retention Period: [Permanent ▼]
1233 — ▶Status: [Active ▼]
1235 — ▶VeriCam Failure Wait Period: [1 day ▼]
1237 — ▶Allowed # of Failed Attempts: [3 ▼]
　　　　　　　　　　　　　　　　　　1
　　　　　　　　　　　　　　　　　　2
　　　　　　　　　　　　　　　　　　3
　　　　　　　　　　　　　　　　　　4
　　　　　　　　　　　　　　　　　　5

1241 — ▶Session Email Options
Send Session Email: Yes:◉  No:○  Only when risk criteria is met:○
Send copy of Session Email to kidSAFE: Yes:◉  No:○

FIG. 12B

IMAGE PROCESSING APPARATUS FOR FACIAL RECOGNITION

PRIORITY

This application claims priority under 35 U.S.C. §119 to U.S. Provisional Application No. 62/045,140, filed in the United States Patent and Trademark Office on Sep. 3, 2014, and claims priority to PCT Application Number PCT/US15/45317, filed in the US Receiving Office on Aug. 14, 2015, the entire disclosures of which are incorporated herein by reference.

INTRODUCTION

The present invention is a novel tool for providing, restricting and modifying access based on detectable features.

Technology has become an integral part of the lives of every individual. Children and young adults are no exception. While many aspects of technology are beneficial to all ages, certain features of technology are not recommended for, or are subject to legal regulations for, specific age groups, genders, or other subpopulations (for example, the United States Children's Online Privacy Protection Act, or implementing Federal Trade Commission Rule regulating the use of certain online services by and online data collection from children under the age of 13, or other similar laws). Therefore, access to certain devices, such as a smartphone or computer, or certain online or offline functions or features of these devices, such as specific applications, data uploading or sharing activities, software or hardware components (such as, for example, a microphone, camera, Bluetooth transceiver, and the like), should or must be limited and provided with access restriction permissioning. Such devices, functions, activities, components, locations (discussed below) and/or features are hereinafter referred to as resources. Such resources may only be allowed to be accessed by certain individuals upon providing adequate identification and/or verification credentials.

Alternatively, a parent, guardian or caretaker, or a person otherwise responsible for a specified location (hereinafter, referred to collectively as a "responsible party") may desire to restrict access for certain individuals, such as children or minors, to certain physical areas or places.

An embodiment of the present invention provides a device or plurality of devices, including system, apparatus and method, (hereinafter referred to as a "tool") for detecting an individual and restricting attributes based on one or more attributes of the individual that may or may not be present.

SUMMARY OF THE INVENTION

In view of the foregoing, it is an object of the present invention to provide an apparatus for granting or denying access to one or more resources.

The apparatus may include an image capture device including a lens, a shutter, an image sensor, and an aperture, the image capture device configured to receive, via the lens a plurality of images. The apparatus may further include a display, a memory storing at least one table or database with pupil distance and age information, and a facial recognition device or module.

The facial recognition device may be configured to perform facial recognition analysis and communicate with a transmitter configured to transmit instructions to a user, the instructions comprising an instruction to the user to pose, for the image capture apparatus, in first and second facial configurations, the first facial configuration corresponding to a non-smiling pose, and the second facial configuration corresponding to a randomly generated facial pose.

The apparatus may further include a processor configured to generate a random facial pose, and a receiver configured to receive facial image information, said facial image information being collected from the user's face.

The facial image information may include detecting an image of the user in the first configuration, detecting an image of the user in the second configuration; and one or more feature inputs corresponding to one or more facial features, wherein at least one of the one or more feature inputs corresponds to one or more age-indicators.

The processor may be further configured to analyze the facial image information to determine positive detection of a full image of the human face in the first and second configurations, if the pose of the human face in the first and second facial configurations was maintained for a required amount of time; and if the second facial configuration captured is: a photograph of the user captured in the first facial configuration; and if the pose in the second facial configuration is the randomly-generated pose requested.

The processor may then output, based on the facial image information, an estimated age of the user and a liveliness result, the estimated age determined by: determining a first pupil location; determining a second pupil location; determining the distance between the first pupil location and the second location; and comparing the distance determined to a plurality of age values stored in the memory.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 2A, 2B, 3, 4A-4C, and 5-7 depict illustrative processes in accordance with the principles of the invention;

FIGS. 10, 11A-11B, 12A-12B, and 13 depict illustrative information in accordance with the principles of the invention;

DETAILED DESCRIPTION OF THE INVENTION

Figure 1:
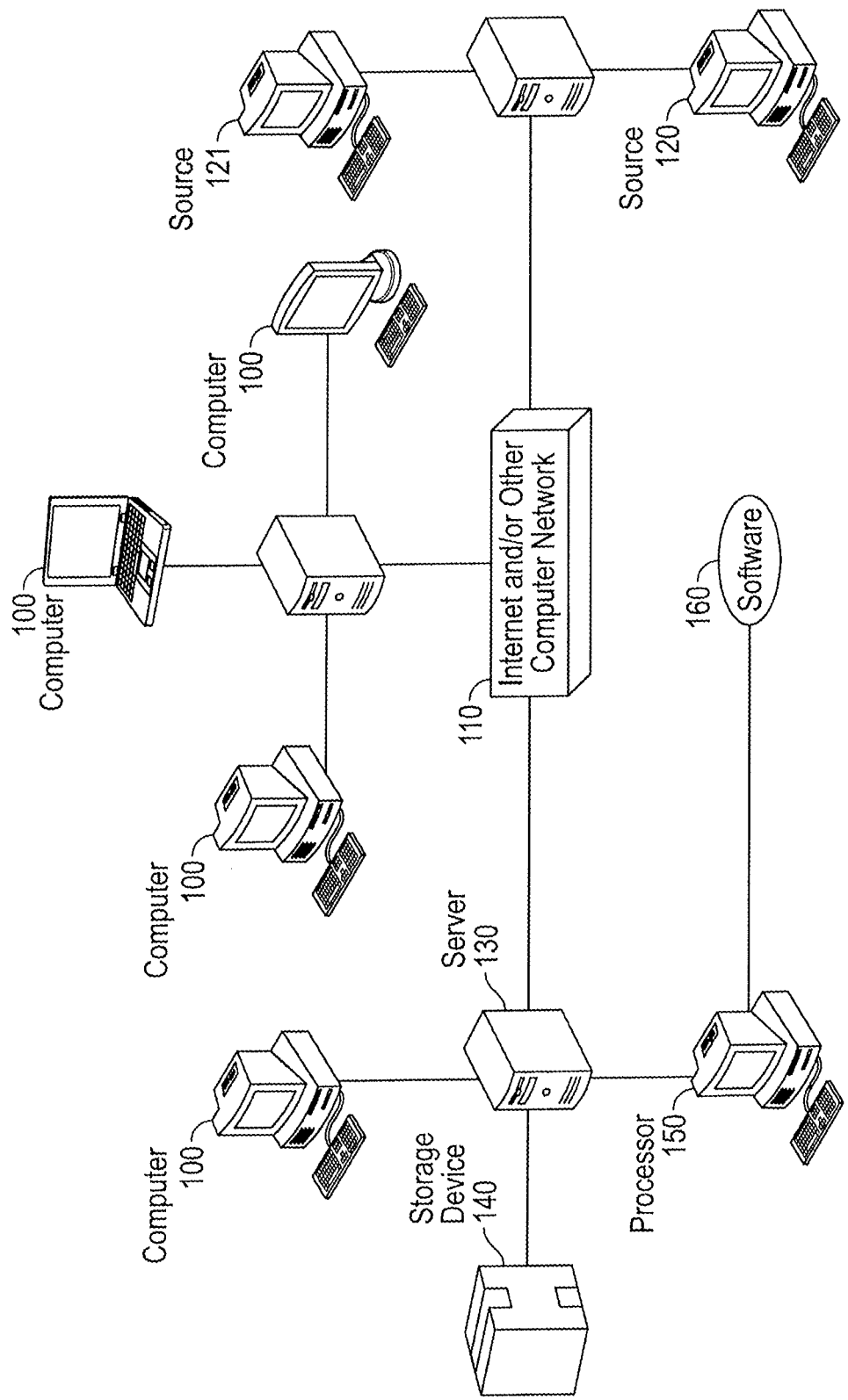
FIG. 1 depicts an illustrative computer system and network in accordance with the principles of the invention.

The tool as disclosed herein provides a multitude of uses in connection with age and/or identity verification, image recognition, and security monitoring.

Therefore, provided is a tool for controlling, granting and/or denying access to one or more resources, and detecting an individual and restricting attributes based on one or more attributes of the individual that may or may not be present.

The tool provides access or denies access to a function or resource located within a device. Additionally, the tool may provide access to a physical location, such as a property or facility. To determine whether access should be granted or denied, the tool includes and/or utilizes a facial recognition device, a data collection component, and a processing component. The tool may be a software application executed by a computer, a CPU or any other processor, a device or modified device implementing features of the tool, or any suitable combination thereof.

The tool may manage access to a plurality of resources. The resources, and access to them (via the tool), may be managed by a third-party, or in-house administrator, or any other suitable individual or entity (hereinafter, referred to as "administrator"). Additionally, an administrator may manage the use of the tool across different entities, and enable cross-use and cooperation among different entities.

The facial recognition device includes a camera configured to capture or collect facial recognition data of a user. The camera captures both still and moving images, and includes an electronic image sensor, a memory, a charge coupled device, and a lens. An optical apparatus including one or more lenses transmits and focuses light from the user on the sensor.

The camera may be a standalone camera, or may be part of a larger apparatus with one or more features. Thus, the tool may interconnect a standalone camera with another device for processing the data, or the camera may be located within the same device for processing the data. Also detected by the facial recognition device is liveliness of a user, or lack thereof. Liveliness, as defined herein, detects one or more features to determine whether the characteristics of the individual being recognized by the facial recognition device are those of a live individual. That is, liveliness analysis determines whether the individual using the facial recognition device, and the image of the individual provided to or captured by the facial recognition device, is that of a live user, and not a photograph, video, or other suitable medium of another individual.

The data collection component is configured to collect facial recognition data and liveliness data from the facial recognition device. The processing component is configured to analyze the facial recognition in order to determine, for example, an estimated age of the user, compare the estimated age of the user to a predetermined (or dynamically determined) threshold age, analyze the liveliness data to determine the liveliness of the user and, if the user's estimated age (or other variable) satisfies the threshold age (or other threshold variable), and the liveliness data indicates a presence of liveliness (or a lack of liveliness), then grant access or deny access (or set a flag to grant access or deny access) permission to the resource.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

An exemplary system for implementing the invention and using the tool includes computer 100 as shown in FIG. 1, or a similar data processing apparatus, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, Digital Video Disks (DVDs), Bernoulli cartridges, RAMs, ROMs, and the like.

Computer program code that implements at least some of the functionality described herein typically comprises one or more program modules that may be stored on the hard disk drive or other suitable storage medium. This program code, as is known to those skilled in the art, usually includes an operating system, one or more application programs, other program modules, and program data. A user may enter commands and information into the computer through a keyboard, a pointing device, a script containing computer program code written in a scripting language or other input devices (not shown), such as a microphone, a webcam, touchscreen, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a mobile device, such as a smartphone, tablet or laptop, a peer device or other common network node, and typically include many or all of the elements described above relative to the main computer system in which the inventions are embodied. The logical connections between computers include a Local Area Network (LAN), a Wide Area Network (WAN), and Wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention may be connected to the local network through a network interface or adapter. When used in a WAN or WLAN networking environment, the computer may include a modem, a wireless link, or other means for establishing communications over the WAN, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

An exemplary such system is depicted in FIG. 1. Computers 100 communicate via network 110 with a server 130. A plurality of sources of data 120-121 also communicate via network 110 with a server 130, processor 150, and/or other components operable to calculate and/or transmit information. Server(s) 130 may be coupled to one or more storage devices 140, one or more processors 150, and software 160.

Calculations described herein, and equivalents, are, in an embodiment, performed entirely electronically. Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

In view of the forthcoming detailed description of embodiments of the present invention, it readily will be understood by those persons skilled in the art that the present invention is susceptible to broad utility and application. While various aspects will be described in the context of an embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing and following description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments is presented herein only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 2A illustrates an exemplary process 201 for using the tool in accordance with the invention and providing resource permissioning and access on a device, or access to another device.

At step 203, the tool is installed on a device or application and configured/customized for usage (referred to now as the inventive device, with the inventive device now able to perform various features not previously possible without the tool). The device may include one or more applications.

The device may be the device or application a user is desiring to access, or it may be a device, such as an electronic security device, that in turn provides access to a resource in another device, application, or location. For example, the device may be a mobile phone, and the user may be attempting to access certain restricted features within the phone or within an application on the phone. The device may include the computing device 100 discussed in FIG. 1, and implement all or some of the features of the tool, and the device may be a customized device for operation within the tool.

The device incorporates a display, such as an LED screen. The LED screen may incorporate touch screen features. The device may include one or more of an application processor, a CPU, a GPU, one or microprocessors, main memory (DRAM or SDRAM), flash memory, an operating system and drivers, run-time system, and application software, a Bluetooth chipset, a wireless chipset, antenna, microphone, speaker, audio processor, a WiFi chipset, a gyroscope, GPS chipset, camera, battery, and other various components.

The CPU includes a control unit for using electric signals to carry out stored program instructions. The control unit communicates with an Arithmetic logic unit within the CPU and memory.

The inventive device may incorporate system-on-a-chip architecture with an application processor executing application software, middleware, and an operating system. The architecture may further include a modem or baseband processor with its own operating system for responding to baseband radio activities, such as transmission of audio, video and other data contents.

At step 205, the device or application utilizes the tool to perform a series of operations for resource permissioning and access (a session).

At step 207, the data utilized and generated during step 205 (session data) is analyzed and processed on a back-end web portal.

FIG. 2B illustrates an exemplary high-level process overview of step 205.

Step 205 may include the following sub-steps: (1) at step 209, the tool captures a first image of a face in a first state, such as a smiling state; (2) at step 211, the tool captures a second image of the face, in a second state, such as a non-smiling state; (3) at step 213, the tool determines the age and/or liveliness of the user based on one or both of the two images; and (4) at step 215, the tool sets a flag based on the age and liveliness determinations. In steps 209 and 211, the first and second states are not limited to smiling and non-smiling states, and may include any facial expressions, so long as the first state is different from the second state.

Figure 3:
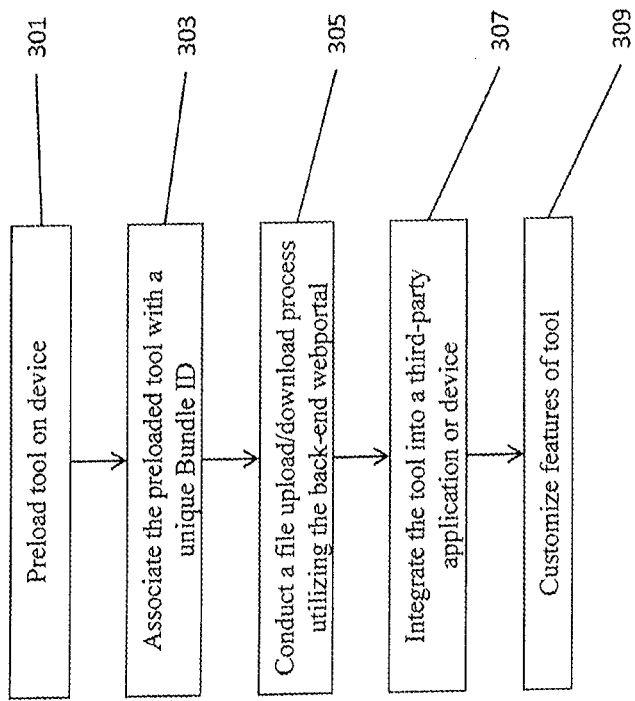

FIG. 3 describes step 203 in further detail. At step 301, the tool may be preloaded onto the device, or may be installed using any suitable methods, such as via software preprogrammed onto the device, downloaded to the device or any additional suitable methods. For example, the tool may be provided as software development kit (SDK) application, which may be installed in a software application. The software application in turn may be installed on a device.

The tool may be provided directly to the device, and may be downloaded or retrieved by the user of the device. The tool may be provided to prevent or grant access to a resource located within the device, within a piece of software located within the device, a resource located on another device, or to a physical location located separate from the device.

At step 303, the retrieved/downloaded tool is associated with a unique bundle ID.

At step 305, the tool conducts a file upload/download process utilizing the back-end web portal disclosed in step 207. The process includes generating an SDK for a specific bundle ID, and creating an API key and secret key for the generated specific bundle ID.

At step 307, the tool is optionally integrated into one or more third party applications on the device. At this step, the use of the tool is customized for a specified location, during a specified process. For example, the tool may be customized to be used within a third party application during an account creation process to ascertain that the account creator is of sufficient age. In another example, the tool may be used to prevent the device from accessing certain features (such as chat messaging features, social sharing features, or photo or video uploading functionality) or from making certain purchases, based on certain characteristics of the user.

At step 309, the tool is customized by an administrator. As referred to herein, administrator may be a person, program or company responsible for maintaining a device, application, software, or series of devices that are utilizing the tool. The administrators may be customers/clients of the tool, but may be granted additional access, and may customize the use of the tool for their needs. Thus, the administrator may be a company that provides an application on a device, or manages a facility, and contracts to use the tool. The administrator may therefore desire to set features/parameters for access.

The customization may occur via backend portal discussed in step 207. For example, a company (via the administrator) may purchase use of the tool, and may desire to configure certain features, such as the number of unique sessions per user that may be processed, or the number of sessions that can be uploaded for a particular client group or series of applications within a period of time (e.g., the administrator may configure the tool to only process 1,000 attempts per month, or the administrator may configure the tool to only allow a certain number of visitors, such as 50, to access a physical location within a day). In another example, at a first step in an application (i.e., account creation), the company may configure the number of failed verification attempts before lockout to be a first number of attempts, e.g., 3 attempts, whereas at a later step, such as access to a more sensitive feature like chat messaging, the company may configure the number of failed verification attempts before lockout to be a second number of attempts smaller than the first number, e.g., 2 attempts, and a duration of lockout to be a predetermined period of, e.g., 20 minutes. In yet another example, a smile score may be assigned, and a pass/fail result may be configured. Provided below in Table 1 is a list of configurable features/measurements for the tool:

TABLE 1

| Action | Result | Configurable Feature |
|---|---|---|
| Fail Attempt | Lockout<br>Transmitting a<br>notification or report | Number of attempts to lockout<br>Duration of lockout (Lockout period)<br>Age threshold<br>Gender threshold<br>Age-error margin<br>Gender-error margin<br>Error rate<br>Smile expression |
| Pass Result | | Image retention period<br>Risk criteria settings |

Age, gender, ethnicity, weight and other thresholds, as well as associated error margins, can be customized. Thus, the error margin may be set to plus- or minus-20 pounds for the weight error margin and plus- or minus-two years for the age error margin, and the age threshold for a first feature running on the device may require an age threshold of over 20 years old, while a second feature running on the device may require an age threshold of below 10 years old.

The smile expression or score may be assigned a size or value, and may vary depending on other factors, such as age, weight, gender or ethnicity.

Figure 4C:
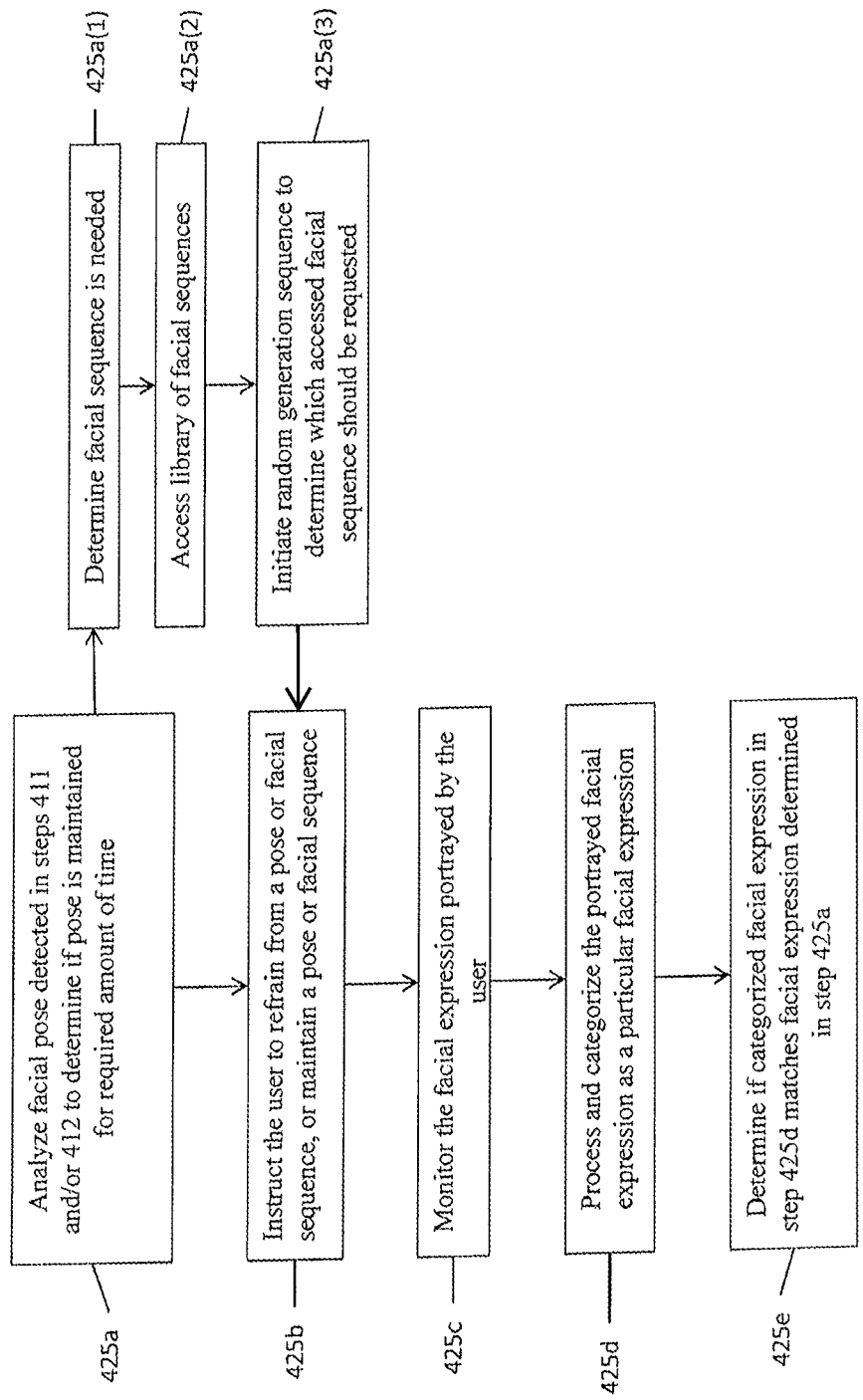

FIGS. 4A-C describe a process for liveliness determination in step 205 for performing resource permissioning, and granting or denying access, in further detail. In this process, facial detection and liveliness detection process/operations may be performed. The two processes may be performed concurrently or separately, but may be processed together or separately, and different features from the concurrent processing may be utilized for different results. Alternatively, facial detection may be performed prior to liveliness detection, or after liveliness detection.

For example, a live image of a user's face may be processed, and upon being instructed to perform a facial movement, the actions may be analyzed to indicate (1) a presence of liveliness; and (2) the age detected from the live image of the user's face during the liveliness detection. Based on the facial characteristics (age) and liveliness detection determinations, the system may determine whether to provide or deny permission for access to one or more resources.

An exemplary sequence includes (a) initiating a liveliness test; (b) detecting a smiling face and non-smiling face (both of which are a part of the liveliness test, with either the non-smiling face compared to the smiling face to determine the presence of liveliness, or determining that two separate poses of the same person/face exist independently in the same session); (c) determining characteristics of the user's face (age, gender, ethnicity, weight, etc.); (d) assigning a result score; (e) determining if the result score provides a pass or fail; and (f) transmitting and storing the results in a database. The sequence may further include a secondary liveliness test, such as an activation code request and input verification.

Granting permission for access can include "unlocking" various features located within the device or application, or unlocking features in a second device, or transmitting an instruction to grant access.

Denying permission for access may include setting a flag to deny access, transmitting an instruction to another device or individual to deny access, restricting certain features on the device or another device, displaying a notification to the user, transmitting a notification or alarm to a third party concerning denial of access, or terminating usage of a feature, device, or software application.

At step 401, the tool for performing liveliness detection and facial detection is launched. The tool, as referred to, can be launched within an application being initiated or utilized on the device, or upon attempted access to a specified location/feature/resource. For example, the user may attempt to access a software feature (e.g., one utilizing a hardware component, such as sharing photographs via the Bluetooth transmitter in the device) with a programmed age-restriction, such as a minimum age requirement of 13 years old. The user may not be allowed to access the software feature until the user successfully follows a series of steps and satisfies certain requirements. That is, the user may be provided with a series of instructions for verification, and may be prompted to submit a number of poses or expressions, including a smiling pose, and a non-smiling pose, at which point age and liveliness are determined. If the user is determined to be of valid age and possess liveliness, a flag is set, and the user is granted access to the software feature.

In another example, an individual may attempt to gain entry to a building, and a computing device, such as a tablet or computer located on a wall of the building, may prompt the user and instruct the user that entry to the building will not be allowed, and access will not be granted (e.g., the door will not be unlocked), until the user successfully follows a series of steps and satisfies certain requirements, as will be discussed in further detail below. In this example, the user may be provided with a series of instructions at the outset, and/or instructions may be provided at each verification step.

At step 403, the user may be provided with an option, or may select an option during step 401, to bypass some or all of the remaining steps, such as the liveliness verification, or the facial characteristics detection and verification step. In order to bypass some of the verification features, the user may input an ID or other suitable identifier that may indicate or be assigned to a previous successful verification.

Step 403 may therefore provide a screen or series of prompts to receive an input, which may be a unique identifier or passcode previously provided to the user upon successful verification. The previous verification must have been similar or identical (e.g., same age threshold), and must be linked to the current verification, either by way of the previously assigned unique identifier, a third party, an administrator of the tool, or by any other suitable means. For example, the tool may be provided to Company A and Company B by a vendor of the tool. Both companies then implement the tool within similar applications and customize their applications with similar age thresholds (Ages 18+). The back end web portal of Company A and Company B may be linked via the vendor, such that the verification of a user and details associated with the verification may be assigned a unique ID, and the client record may be ported over to the back end of Company B's web portal upon successful input of the unique ID received from Company A's verification.

At step 405, the tool may initiate the first phase of verification—performing a liveliness test. The liveliness test includes determining whether the individual utilizing the device and/or attempting to access the resource satisfies the liveliness requirement and functions to eliminate fraudulent access attempts. The liveliness test may include some or all of the following actions: (a) detecting a face (step 411); (b) determining if the face can initiate and maintain a proper state/pose (step 425), thereby verifying that the face is "live"; and (c) requesting and receiving randomly generated inputs (step 431). The liveliness test must be satisfied before proceeding to the next phase, the facial characteristics detection phase.

At step 407, the tool initiates the camera. By initiating the camera, a facial detection sequence is launched and performed.

At step 409, the tool prompts the user to look into the camera.

At step 411, the tool monitors to detect a full face using live-stream video or still photography image recognition, while the user is looking into the camera. Upon detection of the face, the face must be continuously detected, within the image capture frame of the camera, for the duration of the detection sequence. Thus, at step 411, the tool monitors the image frame for continuous detection of the face within the frame. Step 411 initiates during step 409, and terminates (and is satisfied) after all phases of liveliness determination are complete.

At step 412a, the tool determines whether it positively detects the face within the frame for a continuous amount of time.

If the tool determines that it can positively detect the face within the frame for a continuous amount of time (step 412b), the process continues to step 425.

If the tool determines that it cannot positively detect the full face, or required percentage/amount of face in the frame for the required continuous period of time (step 412c), then the process continues to step 413.

The tool may monitor the user's face to determine if the user is looking at the screen, or if the user looks away from the screen. The tool may be configured to display an error code and/or time-out when the user looks away a predetermined number of times during steps 409 and 411. The tool may be configured to display an error code and/or time-out when the user looks away after being prompted to look into the camera, or if the user looks away at any point during the entire liveliness sequence. Alternatively, the tool may display an error code and/or time-out after the process is completed. Therefore, the tool may analyze the facial detection sequence for error thresholds in real-time, during the sequence, or may not analyze for error thresholds until the process is completed. For example, the tool may be configured to time out when it is determined that the user looked away from the screen three times, or any other suitable number of times, or after the process is completed, the tool may display an error code after determining that the user has looked away from the screen two times.

In another embodiment, the tool may not time-out, but may change the activation code that must be inputted by the user. In yet another embodiment, the tool may display an error code, time out, or change an activation code when it is determined that the user smiles a predetermined number of times when not prompted, or moves outside the image capture screen. For example, if the user smiles four times while the tool is determining whether the face is in a proper non-smiling state, the activation code may reset. The activation code is a secondary optional verification sequence and, when reset, the user may be required to restart the secondary verification sequence.

If portions of the face are no longer detected within the image capture frame during the entirety of the detection sequence, an error sequence is initiated at step 413. Alternatively, a message may be provided on the display, prompting the user to "look into the camera" or "make sure your full face is visible in the screen." If steps 409 and 411 are satisfied, (determination at step 412b), the process continues on to step 425, determining that the face is in its proper state.

Step 413 receives predetermined error rates for acceptable partial facial detection. That is, predetermined acceptable variants for steps 409 and 411 may be provided, such as only an adequate certain percentage of the face may be required, or the full face may be required in the frame for a certain amount of time, or the adequate certain percentage may be required in the frame for only a certain amount of time. In some instances step 413 may not be present, as an administrator of the tool may opt to only process images where the entirety of the face is present for the entire duration of the sequence.

If step 413 is utilized/present in the tool, step 415 determines/retrieves any predetermined or preconfigured measurements. For example, the tool may be customized to process faces that are in the image frame for at least 80% of the duration of the liveliness sequence. In another example, the tool may be customized to process faces that are calculated to be 90% of the total facial area, or containing a certain amount of facial identifiers, such as nose and/or eyes.

At step 417, the tool analyzes the face and video stream sequence to determine if the requirements are satisfied. The face may be analyzed in real-time, during the video stream, or may be analyzed after some or all of the other liveliness steps are complete, to determine if, in the aggregate, the face was in the image frame for a satisfactory amount of time.

At step 419, the tool determines if, during the error sequence of steps 413-417, adequate facial detection was performed during steps 409 and 411.

If the partial facial features are deemed sufficient based on predetermined variants, the process continues at step 425.

If facial detection, based on either percentage of the face or duration of the face within the image frame, is not deemed adequate, then at step 421 the liveliness sequence times out or provides an error reading and at step 423, the user may be provided with an option to "Try Again."

Returning now to step 425, during the continuous detection of the face, the tool initiates another process analysis of a maintained pose. That is, the tool may additionally determine whether the user successfully maintains a requested pose.

For example, at step 425*a*, the tool may randomly generate a facial sequence to request from the user. The random generation of the sequence may include the following steps: (a) determining that a facial sequence is needed (step 425*a*(1)); (b) accessing a library of facial sequences (step 425*a*(2)); (c) initiating a random generation sequence to determine which one of the accessed facial sequences should be requested (step 425*a*(3)).

The facial sequence may be a smile, frown or any other suitable pose or expression. At step 425*b*, the tool may instruct the user to refrain from a pose or facial sequence, or may instruct the user to maintain a facial sequence or pose. For example, at step 425*a*, the tool may determine to request a frown, and at step 425*b*, the tool may instruct the user to maintain a frown. In another example, at step 425*a*, the tool may determine to request that the user blink twice or wave a hand, and at step 425*b*, the tool may instruct the user to blink twice or wave a hand. In yet another example, the user may be instructed to maintain a non-smile. Additional facial expressions and bodily movements are contemplated in accordance with the invention.

At step 425*c*, the tool monitors the facial expression portrayed by the user. Then, at step 425*d*, the tool processes the facial expression and categorizes it as a particular facial expression (e.g., as a "non-smiling face"), and at step 425*e*, determines if the categorized facial expression in 425*d* matches the facial expression determined in 425*a*.

The process in step 425 (steps 425*a*-425*e*) may concurrently require a secondary verification method or sequence, which provides additional verification of the liveliness of the user. Alternatively, the secondary verification may be required after completion and satisfaction of sequence 425. Additionally, the secondary verification feature may provide unique identification of a specified user, such as signature or biometric authorization.

Exemplary secondary verification methods may include one or more of a plurality of randomly generated inputs, such as an activation code, a series of swipes, a signature, a series of screen taps in quick or delayed succession and for a requested number of times (e.g., tap the screen three times), screen taps in a specified location on the screen (e.g., tap the right top corner, then the bottom left corner), fingerprint scan, pupil or iris scan, or other biometric readings.

If, while performing step 425, at step 426, the tool determines that the face has not maintained the proper pose, the user may be notified at step 427 with a message "DO NOT SMILE," or any other suitable message (e.g., maintain a frown, wave your hand). Additionally, the message may also be associated with removal of the activation code, or any additional secondary sequence, such as swipes. Therefore, if the face has not maintained the proper pose, step 427 may include a message and removal of the secondary verification method (also referred to as randomly generated inputs), such as the activation code. The secondary verification may be required during the entire step 425 until step 427, and may then disappear, or may only appear once step 425 is successfully completed.

At step 429, upon reappearance of the proper pose, the secondary verification method again be required.

At step 431, the tool may determine whether or not there has been successful continuous detection of the pose instructed in step 425 within the camera frame. Upon determination that these conditions have been satisfied, the tool may provide the user with a prompt for a secondary verification method. The secondary verification method/sequence may be prompted and/or input concurrently with the process in step 425. Alternatively, the secondary verification may be prompted for and/or input after a predetermined amount of time has passed, during which the user has satisfied the requirements of step 425. For example, upon initiation of the process in step 425, the user may right away be prompted for a secondary verification. In another example, the user may be required to maintain the instructed facial expression for a determined period of time (which may or may not be displayed to the user), such as 10 seconds, after which the user is prompted for the secondary verification sequence.

At step 433, the secondary verification method may be displayed continuously for a predetermined amount of time. Additionally, the user may be provided with a predetermined amount of time to satisfy the secondary verification method. For example, the tool may display an activation code for a predetermined duration, such as 15 seconds or any other suitable duration, and the user may be given a predetermined amount of time, such as 20 seconds or any other suitable duration of time, to input the displayed activation code. In another example, the tool may display a series of swipes or an instruction for providing a signature, and the user may be granted a certain amount of time to satisfy the requirements. If the secondary activation sequence is not input within the predetermined time period, the session may time out, or an error reading may occur.

The activation code may be displayed in highlighted letters or numbers. For example, a numeric keypad, or alphanumeric keypad, may be displayed on the screen. Each letter/number in the provided activation code may be highlighted or otherwise emphasized to indicate a sequence for inputting the activation code. This may be done to assist those who cannot see the code properly.

At step 435, the activation code may be reset when a user is forced to restart a session, such as when 3 smiling attempts are registered. The activation code, or any of the secondary verification methods, may be reset for any suitable or configured event, such as each time a user looks away during the liveliness verification process, or whenever a wrong code is entered. If the activation code is reset, the user may be prompted to either restart the verification process, or the user may be prompted to restart only the secondary verification process.

During the steps in the liveliness verification process, errors or time-outs may occur. The error/time-out may result from an inability to determine liveliness, or may be preconfigured to occur in order to prevent fraud.

In a first scenario, time out/error may occur when too much movement of the user's face/head, or the device, is detected. Movement may include twisting or turning of the device, or back and forth head movement, as well as the presence of multiple faces. The tool includes the ability to detect head movement, and may determine that a threshold amount of head movement has been exceeded. Thus, a threshold for head movement is predetermined for the tool. The threshold may be a percentage of movement from the entirety of the liveliness detection sequence, or the threshold may be unique occurrences of head movement. For example, if at a given point in the liveliness detection sequence 60 seconds has passed, and head movement has been detected at different points during the sequence for a total duration of head movement of 6 seconds, the percentage of head movement during the sequence is 10%. If 10% is set as the threshold, the liveliness process will time out at 60 seconds. In another example, 7 unique occurrences of head movement may be detected. If the threshold is 8 movements, upon another detection of head movement, the liveliness feature will time out.

Therefore, an error sequence configuration and determination for the liveliness process may be as follows: (1) receiving a threshold of head/device movement duration (or presence of multiple faces) as a percentage of total duration of the liveliness process at any arbitrary point in time (e.g., 16% of total duration is the threshold of allowable head movement duration); (2) receiving a threshold of unique head/device movement occurrences (or multiple face occurrences) for the liveliness process; (3) determining if the threshold of either has been exceeded; and (4) if the threshold is exceeded, timing out the liveliness process.

In a second scenario, a time out/error may occur when the secondary verification method is not fulfilled within the requisite timeframe. For example, the activation may require input within a 15 second timeframe, and a user may not input the activation code fully within the timeframe. The timeframe may begin upon initial detection of a face (e.g., step 409 or 411) and maintenance of the required facial feature. Therefore, if the user looks away or smiles when instructed to look into the camera and/or not smile (steps 417 or 425), the timeframe is reset, and restarted when the user looks back into the screen and/or maintains the requisite facial pose.

In a third scenario, a time out/error occurs when the input secondary verification method does not match the displayed verification request, such as when the input activation code does not match the displayed activation code.

If any of these time out/error results occur, the user may be provided with an option to restart and initiate the liveliness sequence from the beginning.

While the entire, or a portion of the sequence in FIG. 4 may be captured using video and/or still images, at least one photograph of the user's face may be captured. This photograph may be captured during step 425, or at any other suitable point.

Figure 5:
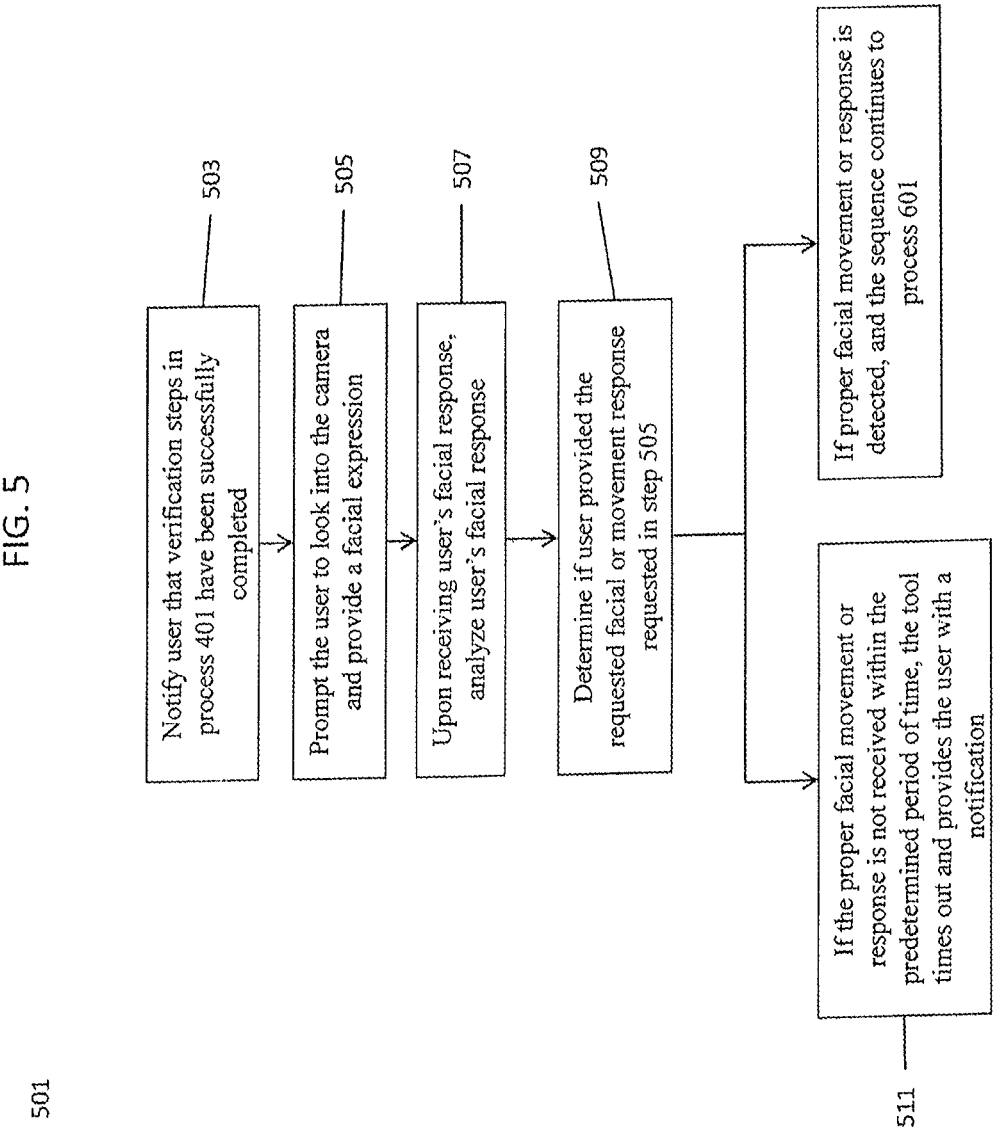

FIG. 5 illustrates the second phase of the resource permissioning sequence, process 501. Process 501 is a continuation of the liveliness sequence, that initiates once the liveliness sequence described in FIG. 4 has been successfully completed. This phase may be referred to as the facial characteristics detection phase or the smiling phase, but additional facial or other poses/expressions and/or bodily movements may be requested from the user. Process 501 is used to further verify liveliness by requesting a second facial pose/movement or bodily movement, similar to the process in step 425. In this phase, facial characteristics detection may also be utilized to determine that the user possesses certain required facial features (such as a minimum age), which may be analyzed in real-time or at a later phase in a different process, or facial characteristics detection is utilized to identify a specific user (e.g., Person A with unique access to a location).

At step 503, the user may be notified that the verification steps in process 401 have been successfully completed. Specifically, the user may be notified that the secondary verification sequence of process 401 has been completed. This step is performed prior to the facial characteristics detection phase being performed.

At step 505, the user is prompted to continue looking into the camera. The user is also provided with a prompt for a facial expression, such as a smile.

At step 507, the tool awaits and analyzes the user's facial response. Upon receiving the response, the tool initiates an analysis sequence. Step 507 may run for a predetermined period of time, such as 10 seconds.

At step 509, the tool determines if the user provided the requested facial or movement response and to what degree or value. The tool analyzes certain features of the face, such as the shape of the lips for a smile, the shape of the eyes for a blink/wink, the lines on the forehead for a frown, to determine if the requested facial feature is provided and to what degree or value.

Step 509 provides different answers as to whether the proper facial/movement response is received, and therefore, whether liveliness has been confirmed. A value/score of 50% or greater, for example, may indicate a determination that liveliness is likely present, and therefore confirms liveliness. A value/score below 50% may indicate that liveliness cannot be confirmed. Additionally, liveliness may include a third categorization of "undetermined," which may be modified as a threshold between the two other thresholds. For example, above 70% may confirm liveliness, below 40% may confirm lack of liveliness, and between 40%-70% may yield an "undetermined" result for liveliness.

If the proper facial/movement response is not received within the predetermined period of time, at step 511, the tool may time out and provide the user with a notification that time ran out and the requested facial expression was not detected.

If, at step 509, the tool categorizes the response as "undetermined," steps 505-507 may begin again, and the user may once again be prompted for a facial feature or bodily movement, which may be the same or different than the first one that was undetermined.

If, at step 509, the tool categorizes the response as a valid response, the second phase of the resource permissioning process is complete, and the next phase, process 601, occurs.

During step 509, the user's full face may not be detectable, or the user may move too much, resulting in the undetermined or invalid readings. Additional exemplary error causes may include movement or blurriness resulting from a user attempting to hand the device to another individual to satisfy certain facial requirements, such as a minimum age of 18, or attempting to use a photo, video, or a series of photos/videos (e.g., a first photo in a non-smiling state and a second photo in a smiling state).

In this case, the process may begin again at step 509, or require the user to begin the entire process, beginning from the initial liveliness process (process 401), again. As in steps 413-419, there may be preconfigured alternatives to requiring the user's entire face or no movement. In that scenario, steps 413-419 may be repeated at this point, using the facial configurations from step 509.

Figure 6:
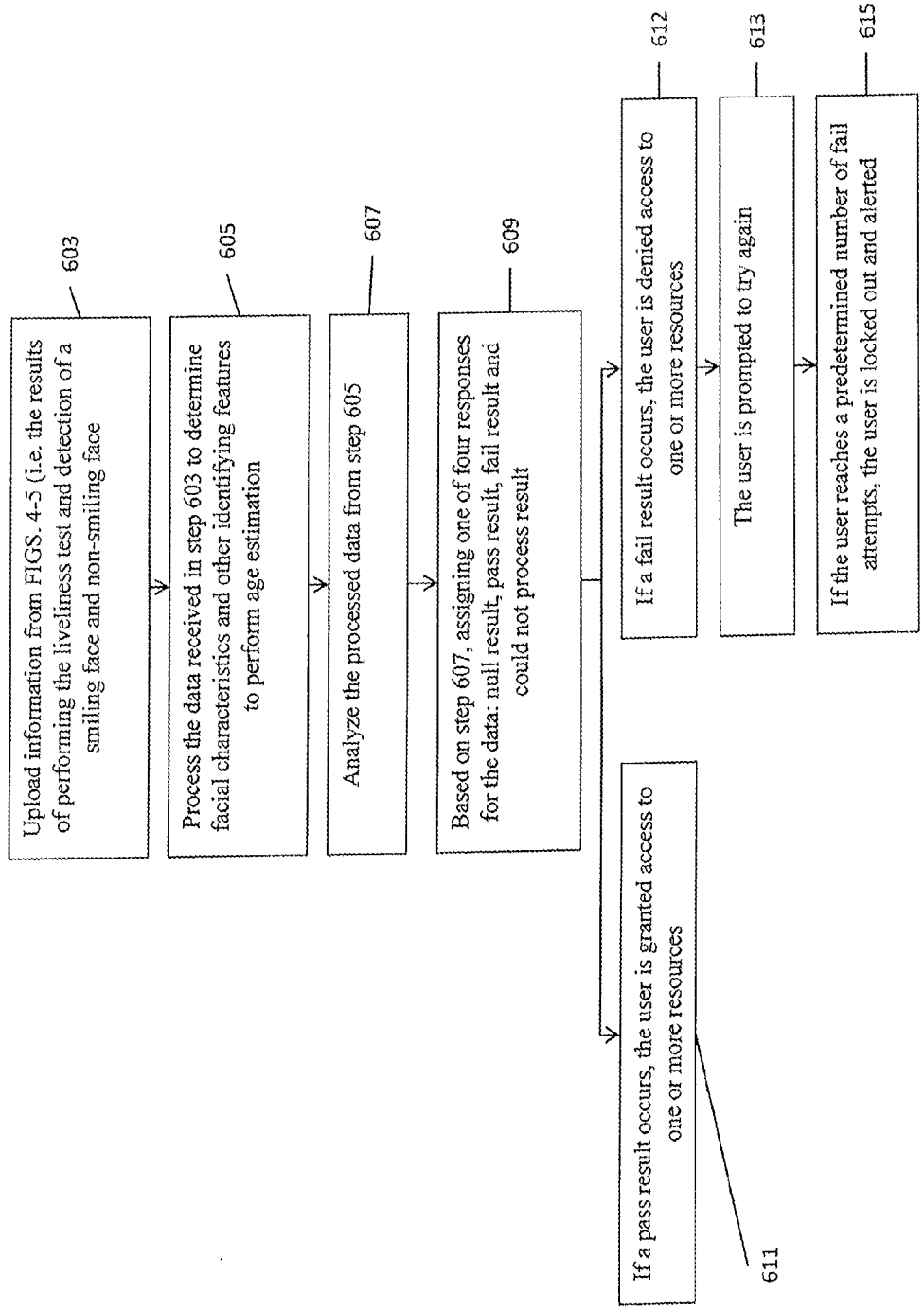

FIG. 6 illustrates the third phase of the resource permissioning sequence. The third phase includes process 601, and receives data transmitted/uploaded from the first two phases. Process 601 also determines whether certain features and requirements have been satisfied. The third phase may be performed on the same device as those of phases one and two, or may be located at a different location. Additionally, the third phase may be performed by a third party, which may receive the information from phases one and two. The third phase may be performed immediately after the first and second phases, and the results of the process may be determined in substantially real-time (i.e., seconds, milliseconds or minutes).

Process 601 may receive the information from the first and second phases as features are measured (e.g., during the respective processes), or may receive uploaded information only after completion of the first and second phases. Thus, information captured locally on the device in the first and second phases may be uploaded at step 603, and may be transmitted for processing. A portion of the data captured during the first and second phases may be transmitted, such as only one or two images, or the entire data set may be transmitted.

The information may be transmitted using any suitable methods, including uploading through the internet and transmitting to servers for storage. The information transmitted at step 603 may including any photographs or videos, error readings, data measurements, scores, and any additional suitable data.

The data from the first and second phases may be transmitted to multiple locations. Different data sets may be transmitted to a first location and a second location. For example, a first data set including all data measured during the processes 401 and 501 (first and second phases) may be transmitted to a server maintained by the administrator of the device or resource. In another example, a second data set including only a portion of the data measured, such as predetermined data points (e.g., only an image and error codes) may be transmitted to a third party for processing.

At step 605, the data is processed to determine certain facial characteristics. Specifically, the images or video is processed to determine facial characteristics, such as an estimated age, gender, smiling value (if not captured in real time), ethnicity, weight, whether or not glasses were detected on the user's face, error margin for one or more features such as age or weight, and confidence score (such as accuracy of gender or eye-glasses detection). Thus, at step 605, age estimation (and additional characteristic estimation) is performed, and provided with a standard deviation or confidence score. The confidence score may be used in conjunction with an age estimation, based on the pupil distance, presence or lack of hair, or glasses. The confidence score may be a confidence in the age determination, based on the presence or lack of certain features that tend to impact the age determination process.

At step 607, the processed data is analyzed. The data may be analyzed to determine if there was a positive or negative presence of eye-glasses, whether age or gender determination satisfies certain thresholds, or whether the age falls within a certain range. A result, such as a pass/fail result, of the data analysis using data from the steps 603-605 is then determined.

At step 609, based on step 607 results, one of four responses or results may be transmitted to the tool/device: (a) Null result; (b) Pass result; (c) Fail result; and (d) could not process result.

Null result occurs if the user, in the image or video, is detected wearing eyeglasses, a hat, or anything else that may obscure or impact an estimated characteristic of the user, such as age. Thus, if glasses are detected based on the data received during process 601, the user is provided with a response that glasses have been detected, or any additional feature, such as a hat, has been detected, and the user is instructed to begin again, from the first phase. Additional features that may increase the estimated age of a user may also be detected. For example, since glasses tend to make a user appear older than their true age, glasses would yield a false positive.

The Null result may also occur when a frame, such as a picture frame, or frame/bezel around a television, phone, tablet or monitor, appears in the image.

Pass result may occur if the user's detected characteristics during the third phase, at step 607, are determined to satisfy a certain threshold. Thus, for example, if there is an age threshold that is predetermined, and the age threshold is set as a minimum age for accessing a resource, when the determined age is equal or greater than the threshold age is received, or consent from someone satisfying the threshold is received, a pass result is transmitted. That is, consent may be granted by an individual at the age of majority, and who agrees to certain terms and conditions (such as privacy policies or notices).

The user of the tool may be prompted to input their actual age, or an age range. The administrator may desire to receive this information in order to further enhance fraud detection and assess accuracy of the age data that is processed by the tool.

In an exemplary sequence, Company D provides a device or application with information or features not suitable for children. Company D desires that only individuals above a suitable age, such as those over the age of 16, access the content or features of the device or application. Company D may configure over age 16 (i.e., age 17) as the age threshold. When a user attempts to use the device or application, the user proceeds through the liveliness determination phase and the smiling process (phases one and two), and the user information from the first two phases is analyzed. The estimated age of the user based on the images is ascertained in the third phase. At step 607, the estimated age of the user is compared against the threshold age set by Company D. If the user's age is determined to satisfy the threshold, a Pass result is transmitted.

Once a Pass result is transmitted, at step 611 the user may be granted access to one or more resources or locations. At step 611, a permission flag may therefore be set for the user verified as satisfying the requirements in phases one, two and three. The permission flag may be set by the vendor of the tool, or a third-party processing the data, and sent back to the administrator of the tool, or the permission flag may be set directly by the administrator. The flag may provide the user with access to resources.

A Fail result may be transmitted if the user does not satisfy the threshold set for the verification process in the third phase. Thus, if the user's age is below the age threshold in the exemplary sequence provided above, a Fail result is transmitted. A deny flag is therefore set for the user and transmitted to the administrator at step 612, indicating that the user is denied access to one or more resources. The user may then be allowed to try again at step 613.

Fail results may be configured to be limited. The number of fail results during one session may be set to any suitable number, such as three. Alternatively, there may be a maximum number of allowable Fail results within a predetermined time period, such as a calendar day or week, or 24 hour period, after which the user is locked out from accessing the resource for another predetermined time period, such as 1 hour or 24 hours. At step 615, the user may be alerted of the lockout.

Could not process results may be transmitted, and may be similar to an undetermined result. This may occur when the user's device is not connected to the Internet (e.g., via cellular, WiFi or Bluetooth connection), or when photo information is not available or cannot be uploaded or processed.

Figure 7:
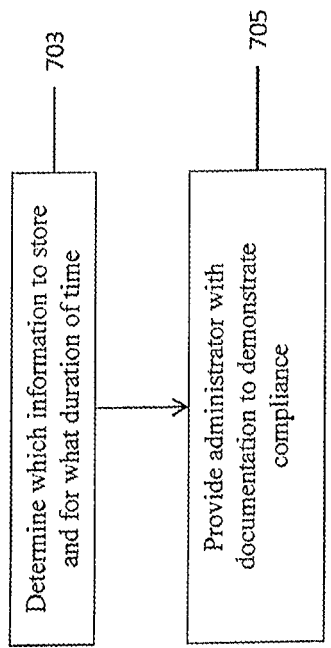

FIG. 7 illustrates the fourth phase of the resource permissioning sequence, and elaborates on step 207 for evaluating session data. The fourth phase includes process 701, which includes a back-end web portal for data storage, statistics, traceability, risk management and settings/configuration options for administration of the permissioning sequence and the data received during the first three phases of a session.

Process 701 may occur at the back end portal, which provides a secure and centralized place to store data captured during the session, including data from the device and data from a third party. The back end portal may also allow an administrator to link identifications and verification information across devices or applications.

At step 703, an administrator for a specified application or device may determine which information will be stored and for what duration of time. For example, the administrator may select photos detected as those under a required age threshold (and therefore possibly deemed children) to be deleted or blurred or otherwise obscured instantaneously, once age determination has been processed, or may select that these photos be deleted after a predetermined amount of time, such as 7 days. In another example, an administrator may select, via the portal, to have certain photos of users detected above a certain threshold stored for a predetermined amount of time.

At step 705, the administrator may be provided with documentation to demonstrate compliance with certain security and/or privacy requirements, such as those of COPPA. For example, a company utilizing the tool that is subject to COPPA regulations may use the web portal to prove that parental consent was provided for a user, by showing a copy of the photo captured of the parent, and linking the photo with a user's device ID that is associated with a child.

The web portal may be accessed prior to a session, such that an administrator may customize the various characteristics and thresholds via the web portal. Various features may be customized. For example, certain sessions may be flagged as a risk, and the administrator may be alerted. This may occur due to the presence of certain risk parameters. Further, an administrator of the tool may configure a session to be flagged any time there is a certain error margin, or when there are more than a predetermined number of attempts or timeouts, or if the smiling value or score falls below a certain percentage.

Figure 8A:
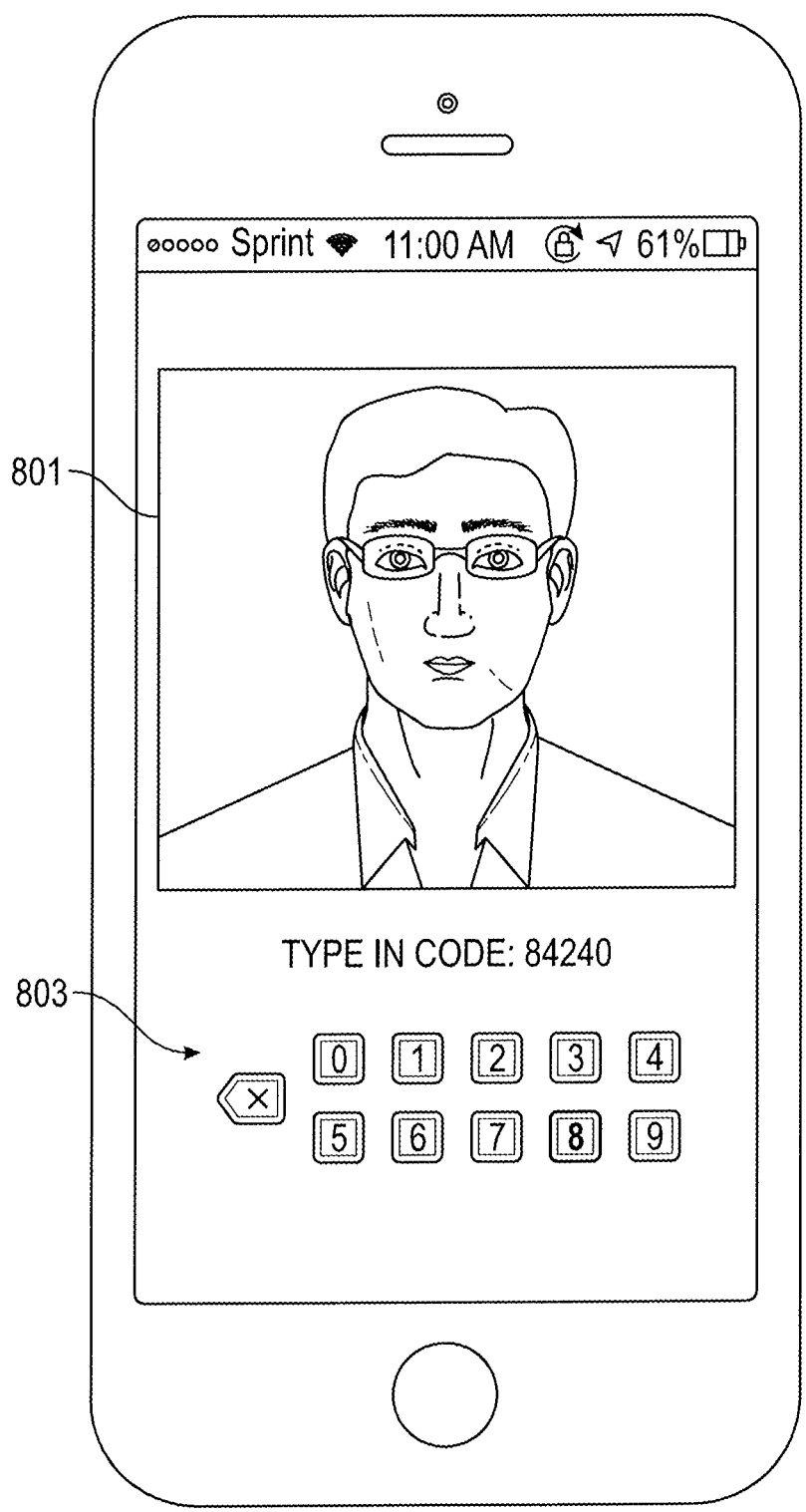
FIGS. 8A-8C and 9A-9C depict illustrative illustrations in accordance with the principles of the invention.

FIG. 8A illustrates a facial detection screenshot in accordance with the invention. Screen 801 illustrates a non-smiling face/pose in accordance with the invention. Secondary verification method 803 is also shown as an activation sequence.

Figure 8B:
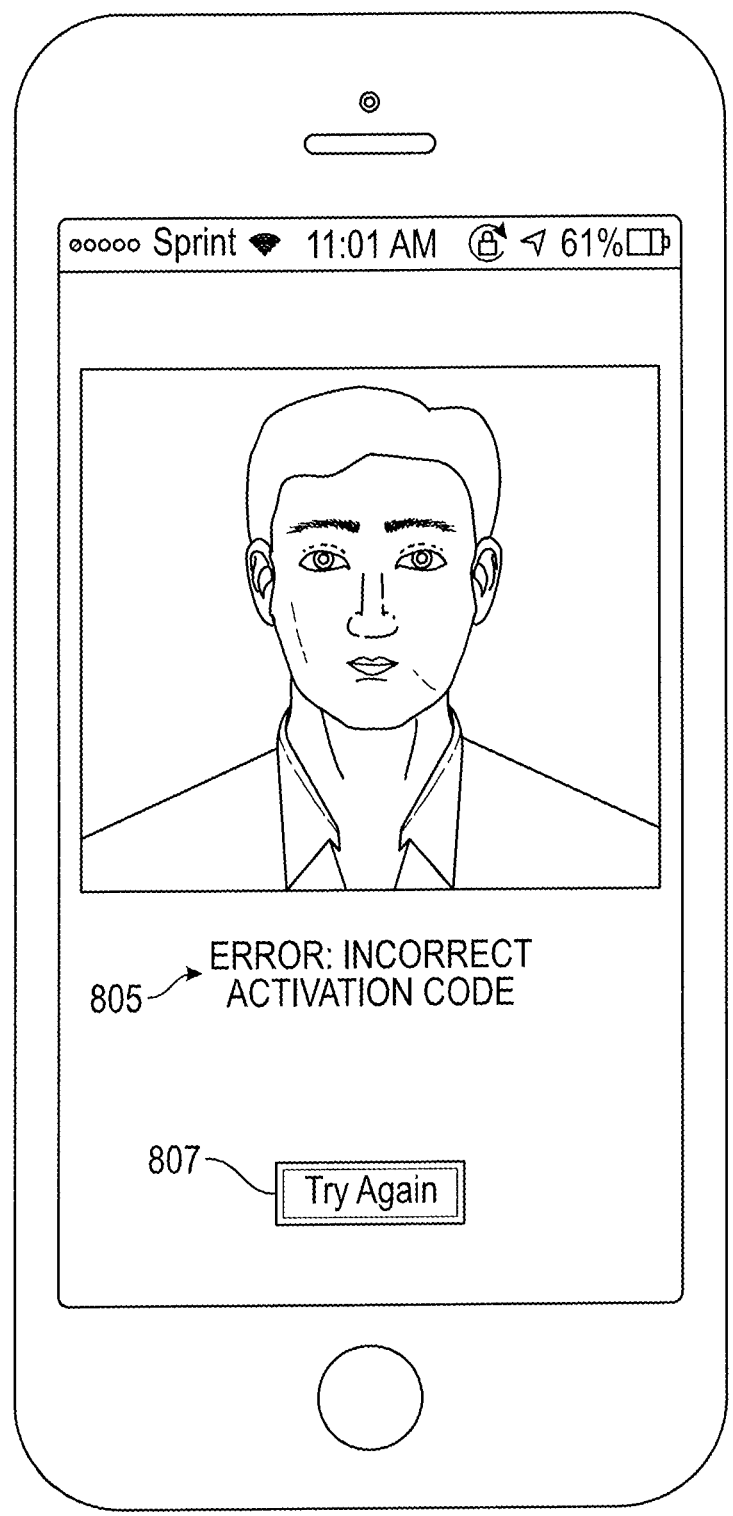

FIG. 8B illustrates the result of an incorrect activation in text area 805, with option 807 to try again, such as during steps 427-429.

Figure 8C:
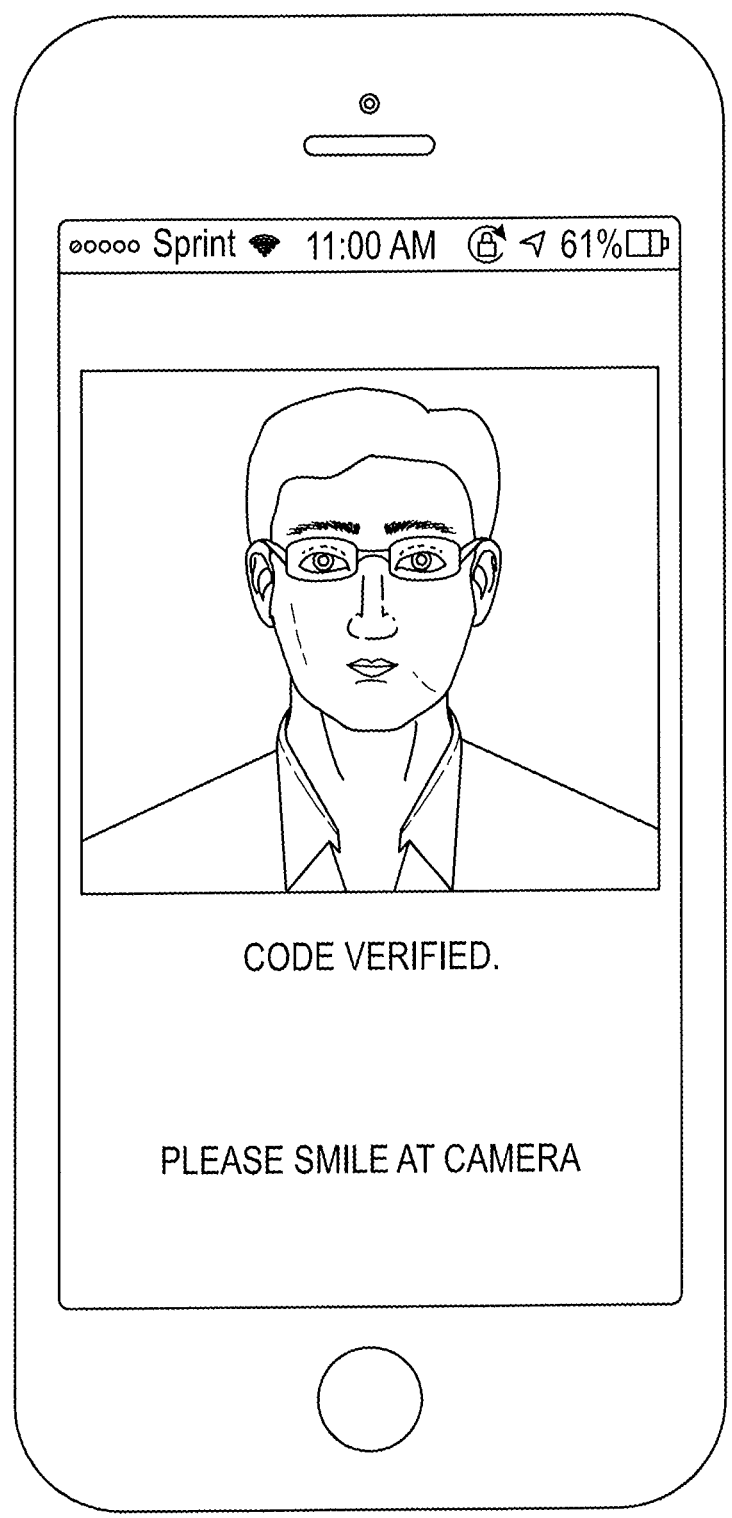

FIG. 8C illustrates a successful verification of the activation code, during, for example step 425.

Figure 9A:
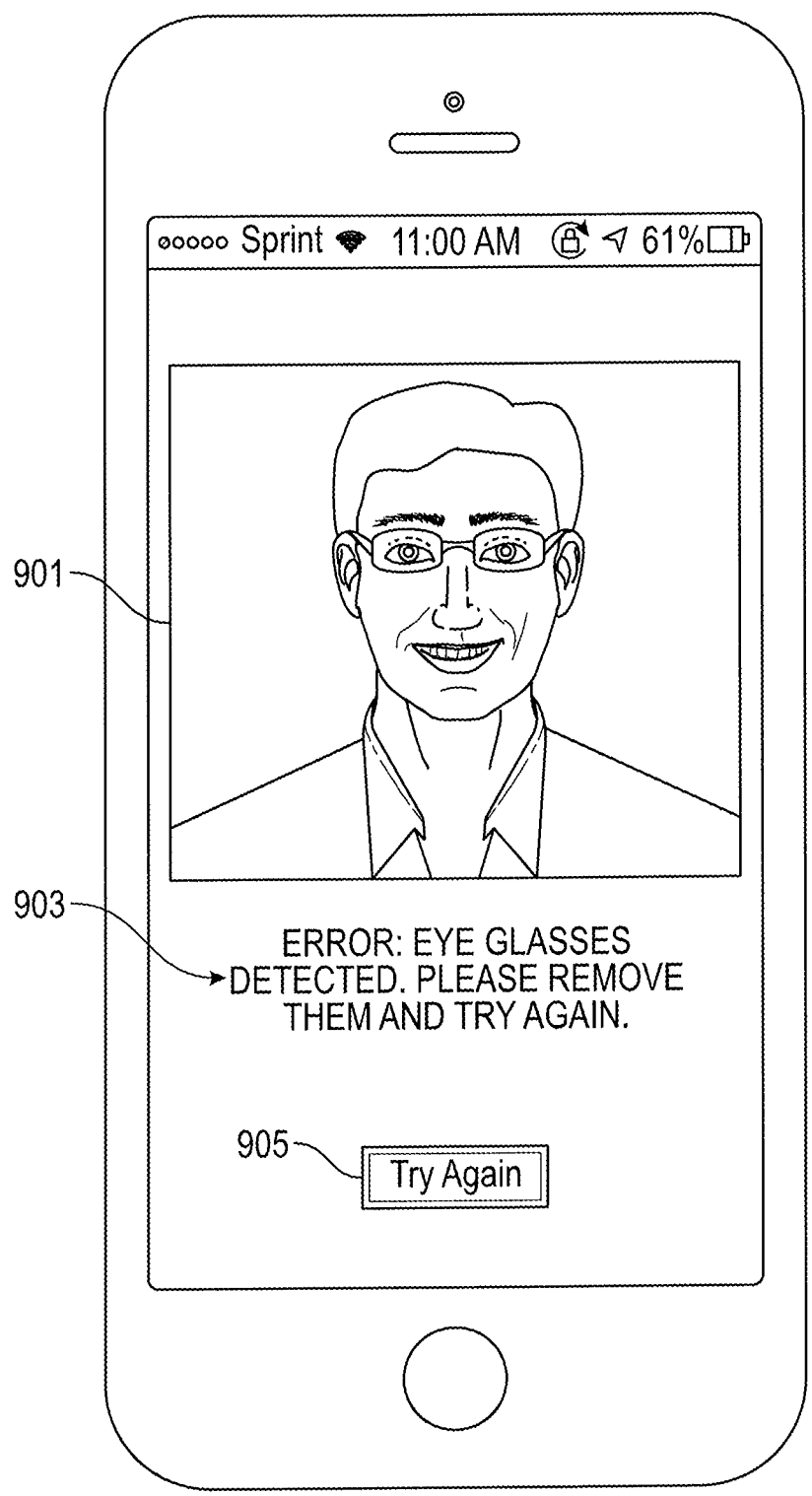

FIG. 9A illustrates an unsuccessful facial pose detected by the camera. As can be seen in screen 901, the user is submitting a facial pose while wearing glasses, thereby resulting an error reading illustrated in text box 903. Selector 905 provides the user the option to try again, such as submitting a new pose without glasses.

Figure 9B:
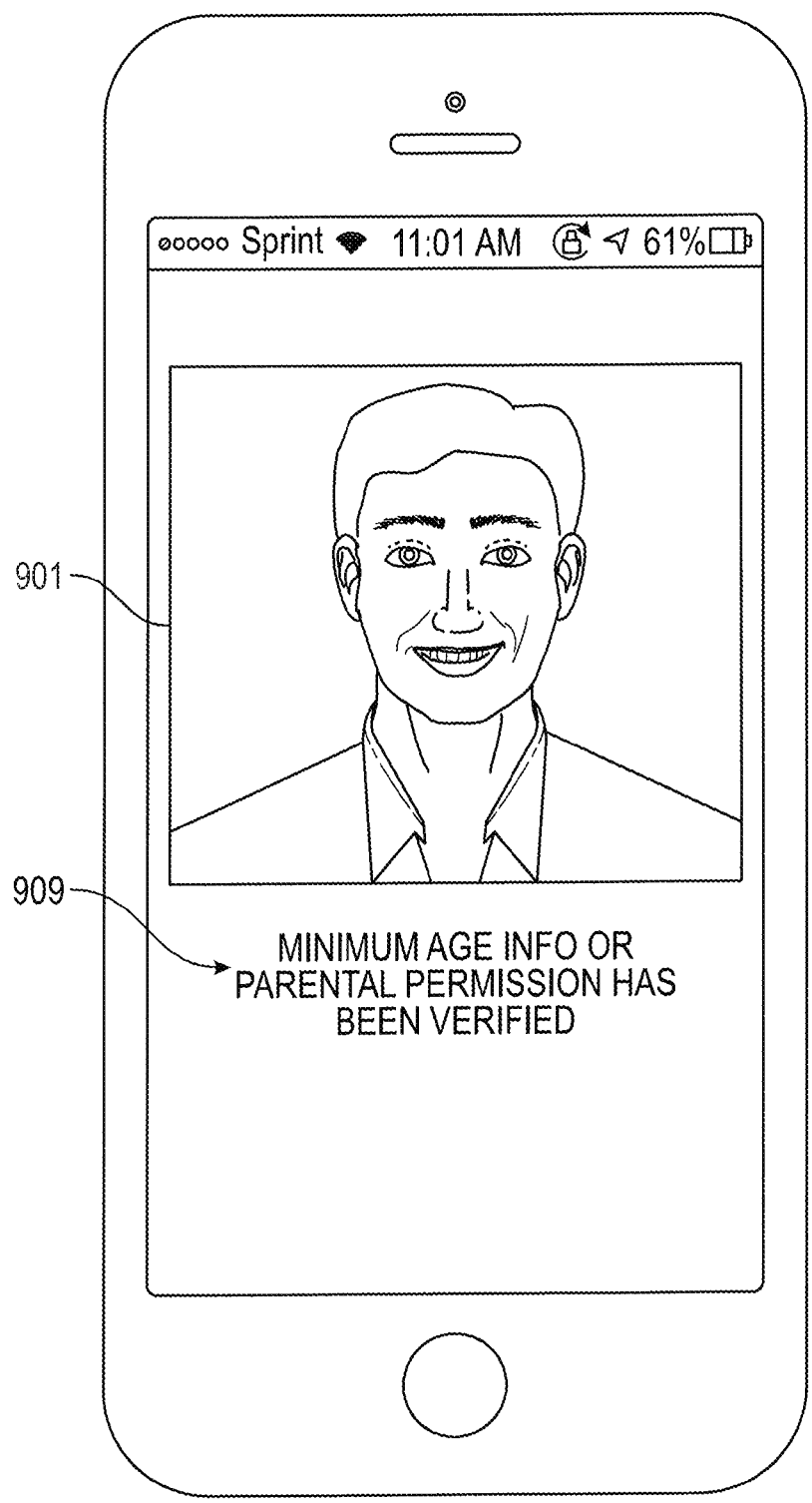

FIG. 9B illustrates another facial pose detected by the camera. This pose illustrates a successful facial pose, as illustrated that the requirements in text area 909 has been satisfied.

Figure 9C:
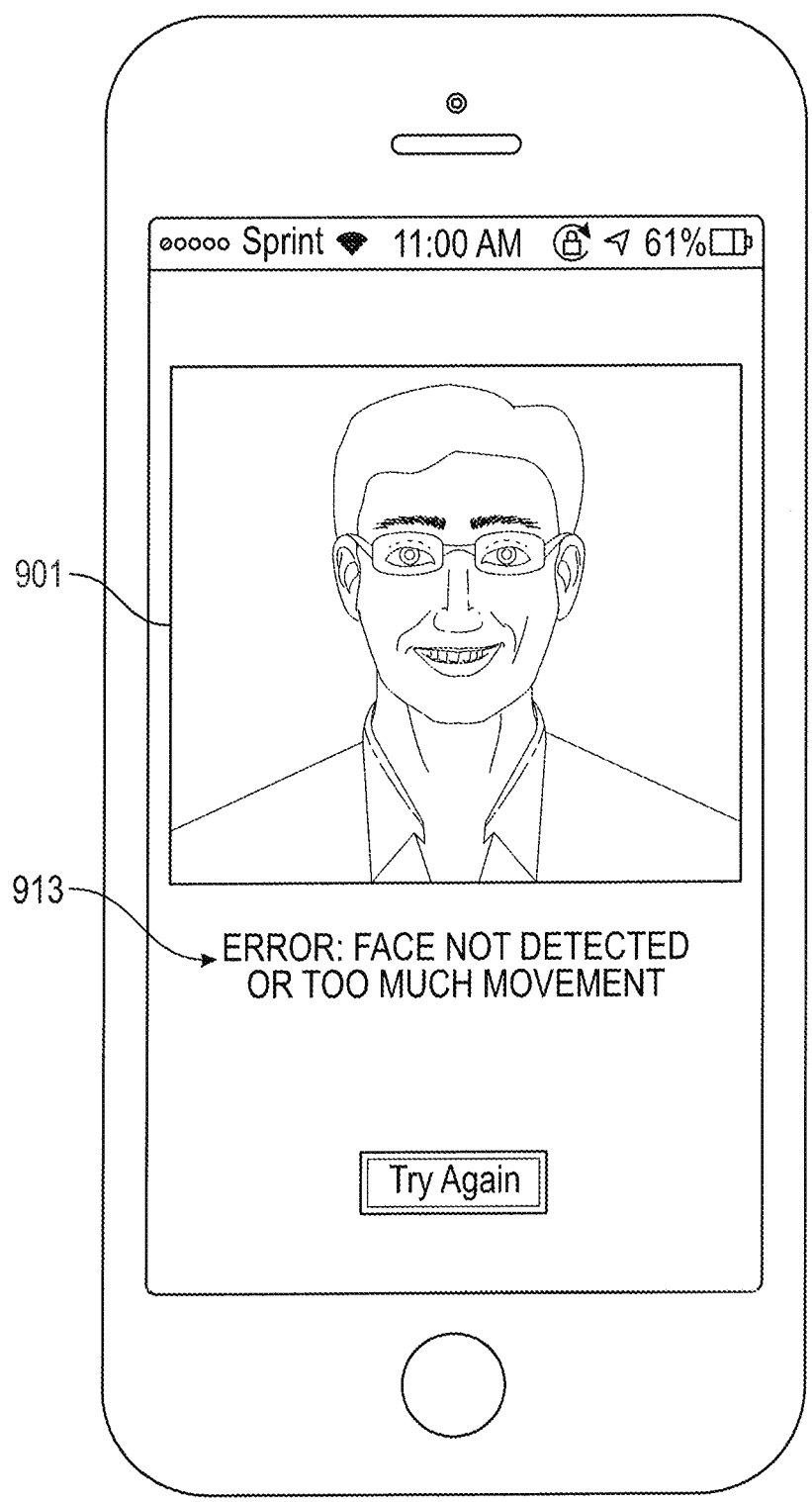

FIG. 9C illustrates another unsuccessful facial pose detected by the camera, as a result of too much movement. Text area 913 records that an error has been detected based on too much movement.

FIG. 10 illustrates a partial view of the backend web portal in accordance with the invention. The web portal includes client name selector 1001, search box 1003, page selector 1005, results per page 1007, and time period selector 1009.

Session information 1011 includes various information from sessions available to an administrator of a resource or plurality of resources. For examples, client name 1013 displays the client name, app name 1015 displays the resource accessed, and app type 1017 displays further identification, such as the operating system, of the resource accessed. Date created 1019 displays the date of the resource access, and session ID 1021 includes a unique identifier for each session and a hyperlink to access details of the session.

Figure 11A:
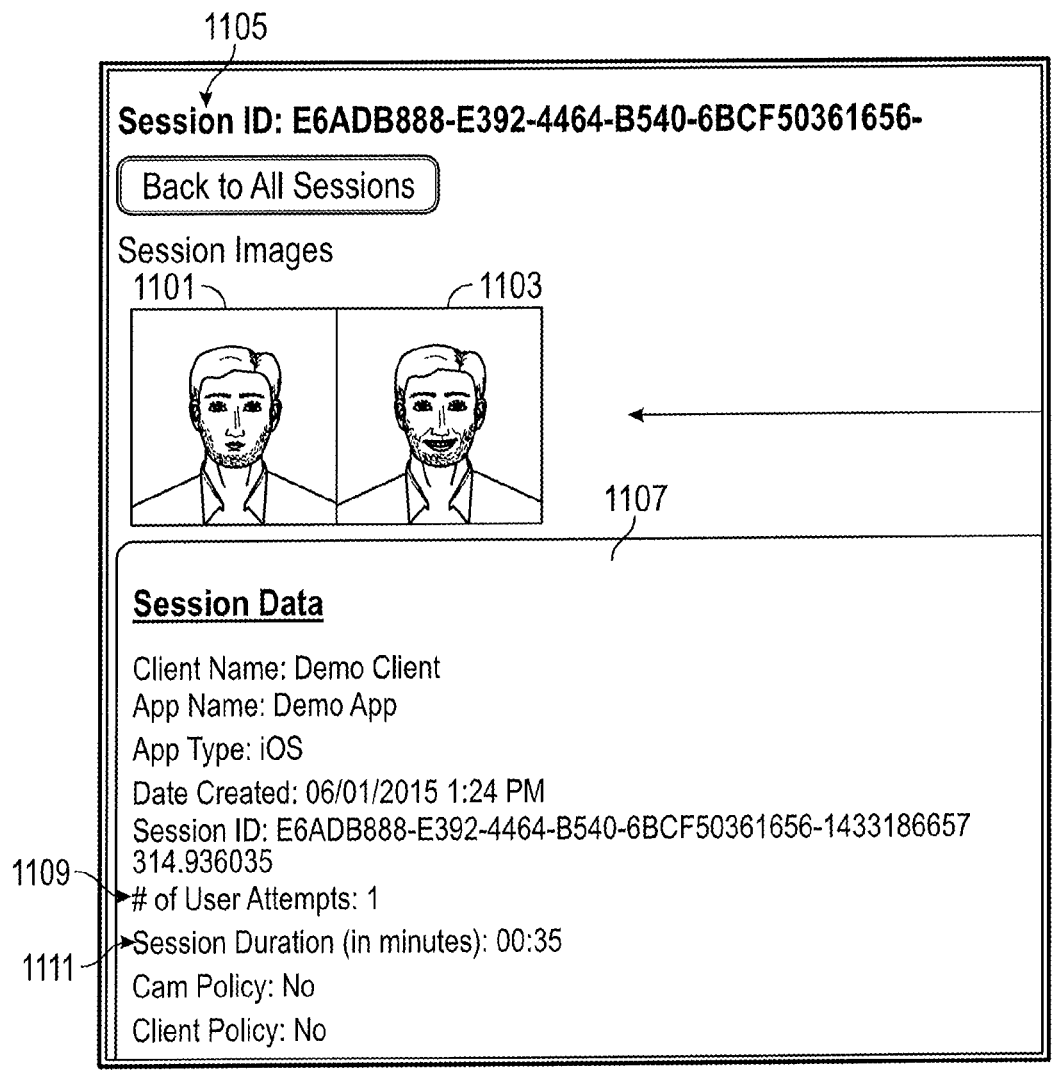

FIG. 11A illustrates an expanded view of session data from selectable hyperlink 1021. Shown are images 1101 and 1103, representing the two images captured during the liveliness and age verification process. As can be seen, the first image 1101 shows the user in a non-smiling state, based on prompts received by the user from the tool while the image is being captured. Thus, image 1101 represents an image capture of the first phase, showing the user in a non-smiling state.

Image 1103 shows the user in a second phase. In this scenario, at the time of image capture, the user has been prompted to smile, but additional facial poses or bodily movements can also be prompted and captured at this phase. One or both of images 1101 and 1103 are then analyzed for liveliness detection based on the user following the prompts to present an indication of liveliness. Further, one or both of images 1101 and 1103 are processed for age verification. It should be noted that session data may be presented with or without images, as discussed earlier. Further, the images may only be available for a limited period of time.

Session ID 1105 represents the unique identifier associated with this session. Session Data 1107 represents additional information, including number of user attempts 1109 and session duration 1111. User attempts 1109 represents the number of times the user has attempted to access a resource or run the liveliness detection and age verification sequence. Session duration 1111 represents the length of the verification session.

Figure 11B:
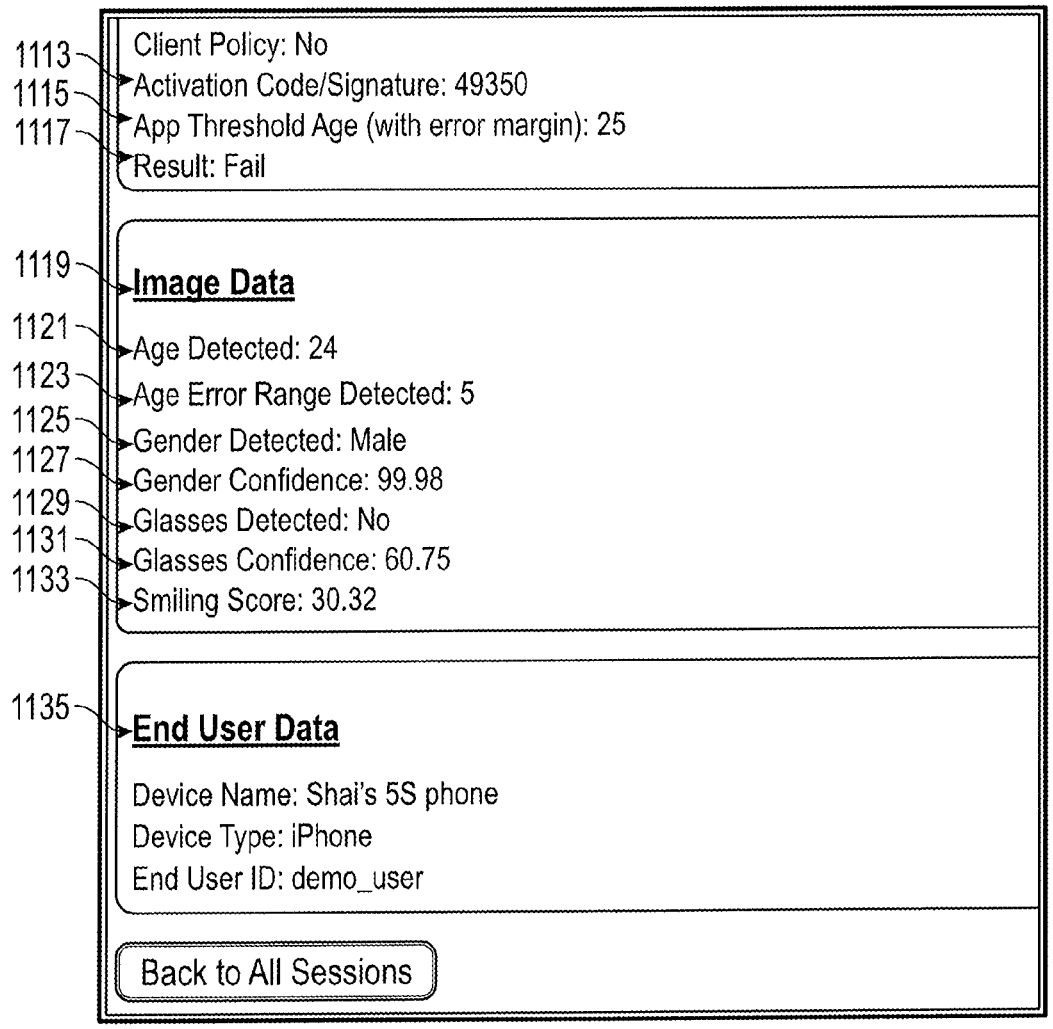

FIG. 11B illustrates additional information that may be included with session data. Activation code 1113 displays the activation code prompt for the user. Threshold age 1115 displays the predetermined threshold age that was set for the user to access the resource. Result 1117 displays that the user has failed to satisfy the requirements and meet the threshold age.

Image data 1119 displays particular information that was collected from one or more of user images 1101 and 1103. Additional data may also be collected. Age detected 1121 illustrates that the user age, based on age determination techniques, is 24, with error range 1123 of plus or minus five years (e.g., a range of 19-29 years old). Gender 1125 shows that the user has been detected as a male, with a gender confidence score 1127 that the user is a male based on certain facial features as discussed of 99.98. Glasses detected 1129 illustrates that no glasses have been detected in the user image, with a confidence score 1131 of only 60.75%. The user displays a smiling score 1133 of 30.32.

End user data 1135 includes information about the user, such as the device name, device type, and user ID.

Figure 12A:
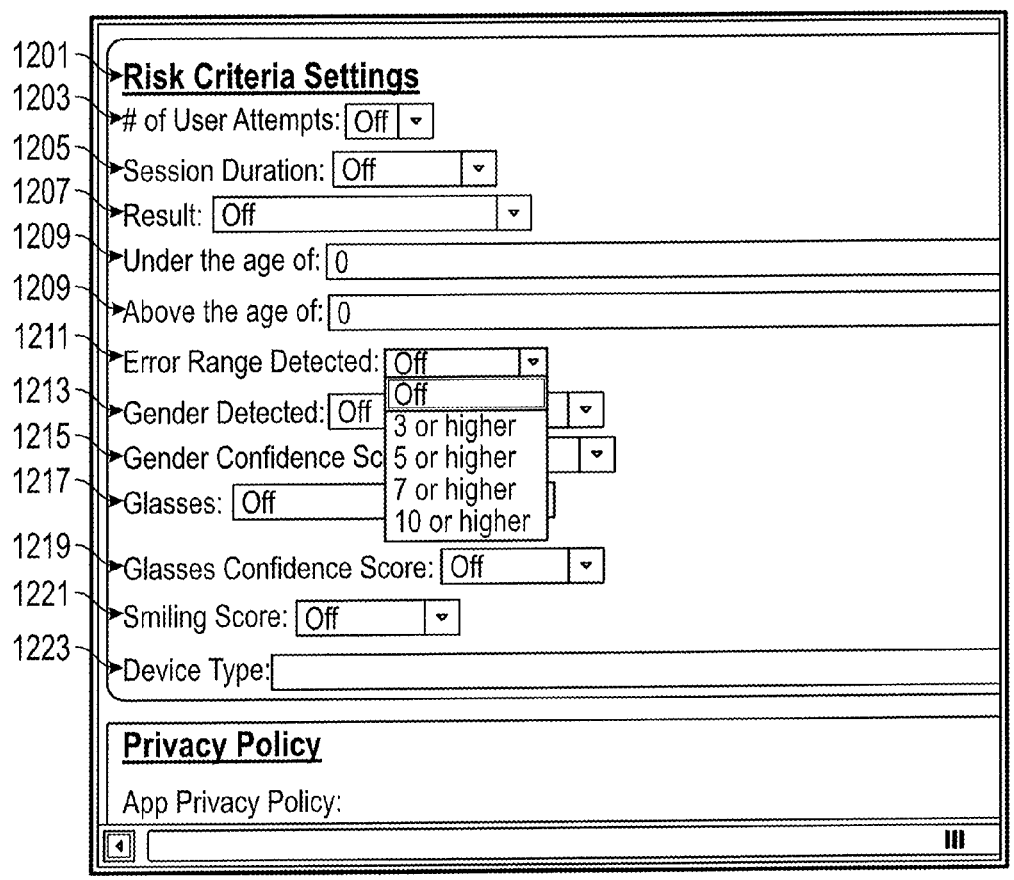

FIG. 12A illustrates an exemplary section of the backend web portal that may be customized by a resource administrator for risk and fraud detection purposes.

Under risk criteria settings 1201, the administrator may customize and turn on/off specific parameters for which a risk flag will be created for a session, such as number of user attempts 1203, session duration 1205, result 1207, age settings 1209, error range 1211, gender detection 1213, gender confidence score 1215, glasses detection 1217, glasses confidence score 1219, smiling score 1221, and device type 1223.

FIG. 12B illustrates additional features of the backend web portal that may be customized by the administrator. Threshold age selector 1225 may be customized for a specified resource. For example, selector 1225 has configured the age threshold to be set at 18, while the error range/margin for the age set in 1227 is plus or minus 7 years (e.g., the user must be at least 25 years old to receive a pass result where the threshold is a minimum age, and the user must appear under 11 years old to receive a pass result where the threshold is a maximum age threshold). Selectors 1229 and 1231 allow the administrator to customize the retention period for a passed or failed image, respectively. As illustrated, both have been configured to be retained permanently, but may be configured for any other suitable setting, such as delete immediately, or a retention period of one day, two weeks or a year.

Status 1233 allows the vendor of the tool to select whether to keep a client profile active. The vendor may also select to retain a profile as inactive, where it can be reactivated at any time.

Failure wait period 1235 provides the option to customize the amount of time a user is required to wait after reaching the customized maximum number of unsuccessful verification attempts. That is, before attempting to access the resource again, the user must wait the period provided in 1235 (in this case 1 day, but also includes any other suitable amount of time or days) after reaching the maximum number of allowed failed attempts, before allowing another attempt. Allowed number of failed attempts 1237 allows customization of the number allowable failed attempts.

Session email options 1241 provides the option to send an email of the session results to the administrator, and provide a copy to a higher level administrator, if one exists.

Figure 13:
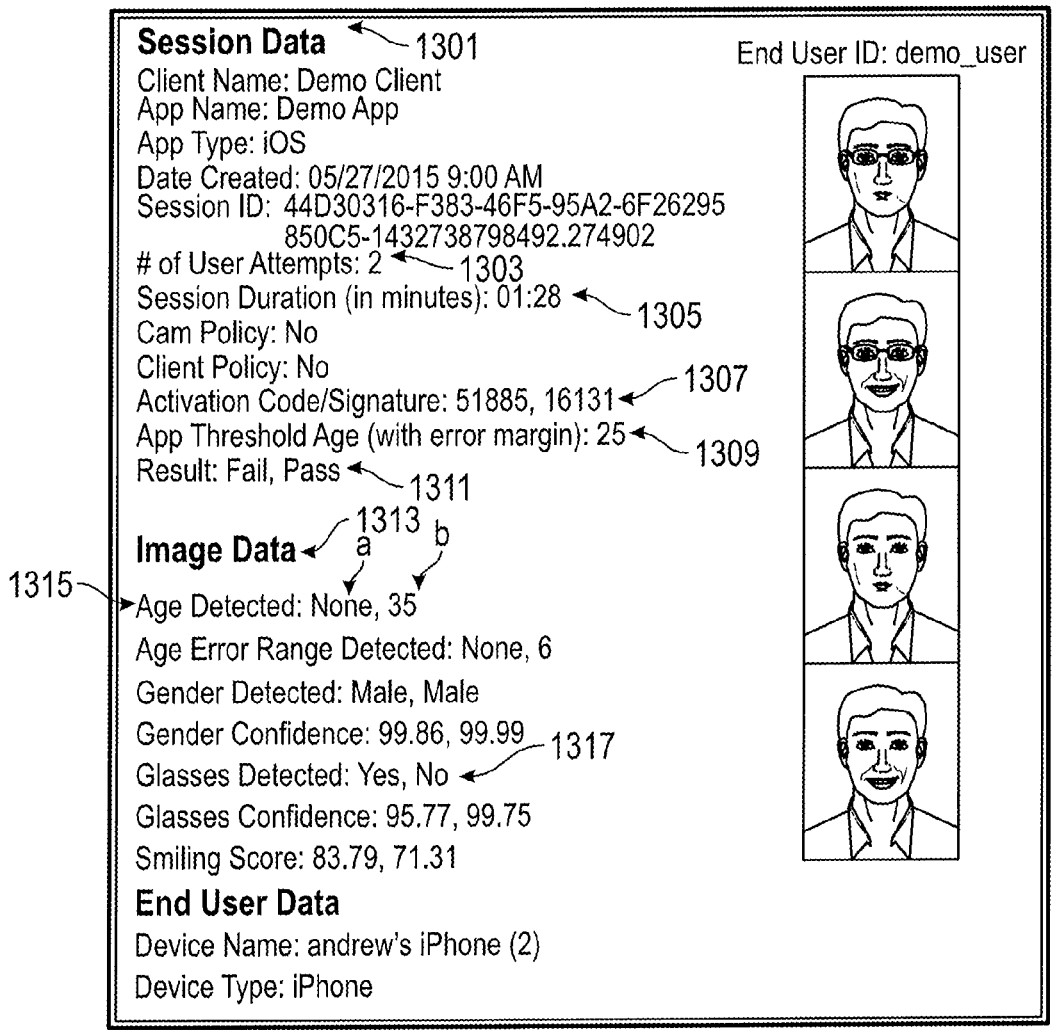

FIG. 13 illustrates an exemplary session result where the user made two attempts, the first one being unsuccessful due to the presence of glasses. As can be seen in the session data 1301, the number of user attempts 1303 is 2, and the session duration is 1:28 due to the number of attempts. Activation code 1307 illustrates that the user was prompted with, and required to successfully input, two separate activation codes, and threshold age 1309 illustrates that the required threshold age to access this resource has been set at 25.

Result 1311 shows that the first result of the user attempt is a fail, which is why the user made a second attempt, which it passed. Image data 1313 shows that the age detected 1315 in the first attempt is none (1315a), based on the inability or unwillingness to detect an age due to the presence of glasses, whereas the age detected in the second attempt is 35 (1315b). Glasses detected category 1317 shows that the first attempt detected glasses, whereas the second attempt did not.

Figure 14:
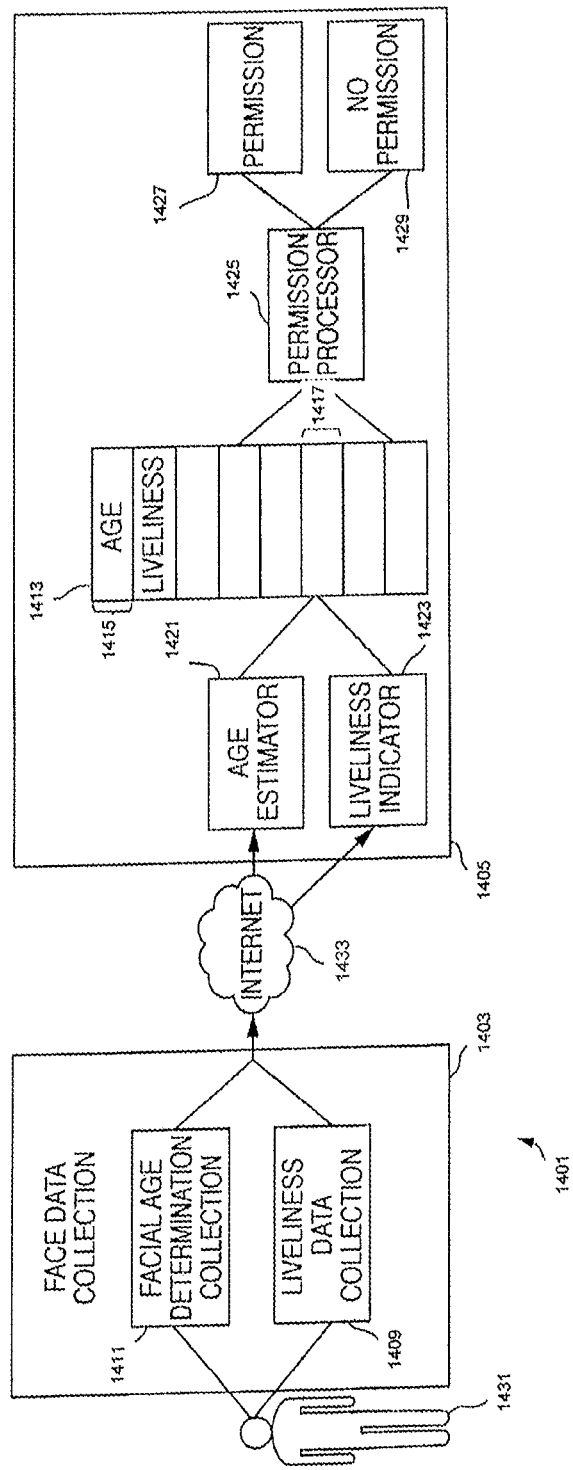
FIGS. 14-16 depict additional illustrative processes in accordance the principles of the invention.

FIG. 14 illustrates the steps discussed in FIGS. 4-7, in reference to a particular device. FIG. 14 refers to system 1401, which includes device 1403.

Device 1403 may be a computing device or a handheld device, or may be part of a network of devices. Device 1403 may be any suitable device, such as a mobile telephone, smartphone, tablet, phablet, laptop, personal computer, server, desktop, smartwatch, gaming device, or the like.

Device 1403 may be a device for which access is desired. That is, it may be desirable to limit access to device 1403, or a resource, such as a software program or application within device 1403 or a feature therein, based on various characteristics of the user. Alternatively, device 1403 may determine whether access should be provided to an individual for another location or device. For example, device 1403 may determine whether to grant an individual access to an age-restricted computer located in a separate computer bank. In another example, device 1403 may determine whether to grant an individual access to a secured facility, such as a military facility, bank, casino, age-restricted industry conference, or to a bar where alcohol is served, and there is a desire to prevent individual below a certain age from entering, or any other suitable facility.

Device 1403 may include liveliness data collection apparatus 1409. Device 1403 may include facial characteristics determination apparatus 1411. Apparatus 1411 is used to determine an estimation or calculation of a particular characteristic of an individual. For example, a "facial age" of an individual may be determined. That is, apparatus 1411 performs facial recognition to determine an estimated age of a user based on a plurality of facial features.

In order to determine a facial age of an individual, apparatus 1411 may include a camera that captures still images, as well as video images. The camera may include a lens for directing light to an image and a sensor for focusing an image. The lens may vary in focal length, aperture and other characteristics. The camera may also include a lens release button to allow a user to replace the lens. The camera may also include a shutter button, which may be a physical button or may be an on-screen button that may be activated via a display on an apparatus 1411. The camera may also include a lens mount, which is a section for connecting an exchangeable lens to the camera body. The camera may also include a mirror, which reflects light entering the camera through the lens to direct such light to a viewfinder. The camera may also include a battery to provide power to the camera. The camera may also include a tripod socket which may be placed at the bottom of the camera. The tripod socket may be used for attaching a tripod, which, in turn, is used to avoid camera shake and the resulting blur. The camera may also include a built in flash for providing light on an object to be photographed (such as a person's face).

The camera may be a part of apparatus 1411 or may be coupled thereto by wired or wireless protocol. For example, if a camera is not a part of apparatus 1411, the apparatus 1411 may communicate via, for example, WiFi, Bluetooth or Ethernet protocols. A person may activate a control on apparatus 1411 which, in turn, sends a signal to the camera to take a photograph and send the photograph to apparatus 1411 for processing of, for example, facial age. In the alternative, such processing may be performed in the camera and the result sent to apparatus 1411.

Apparatus 1411 may be used to detect any suitable user attribute such as age, gender, height, weight, percentage of hair remaining on head, thickness of hair on head, or ethnicity. Apparatus 1409 is used to determine whether the individual displays sufficient liveliness, a feature that will be discussed in further detail below.

An attribute such as age may be determined based on various features of a person's face. For example, to determine age or gender, mouth width, frown lines, distance between eyes, size of nose, distance between ears, and distance between eyes and mouth may be analyzed. For example, once a camera takes a photograph of a person, apparatus 1411 may analyze such person's face. That apparatus 1411 may analyze the distance between pupils ("pupil distance") of the person and determine a person's age based on such distance. For example, the average pupil distance may vary for different ages, as shown in the pupil distance chart in FIG. 17A. The Y-axis illustrates the mean pupillary distance, increasing up the axis. The X-axis illustrates the age of an individual. As can be seen, the mean pupillary distance at age 18 is roughly 62.5 mm, whereas the mean pupillary distance at age 32 is 64 mm.

The apparatus 1411 stores the above and other information of age and associated pupil distances in a memory such as a RAM, ROM, hard disk drive, FLASH, EEPROM, and the like.

Thus, for example, if apparatus 1411 determines that the mean pupil distance is 65 millimeters (mm), it would be determined that the person is approximately 39 years old. However, if apparatus 1411 determines that the mean pupil distance is 67 mm, it would be determined that the person is approximately 44 years old.

Figure 17A:
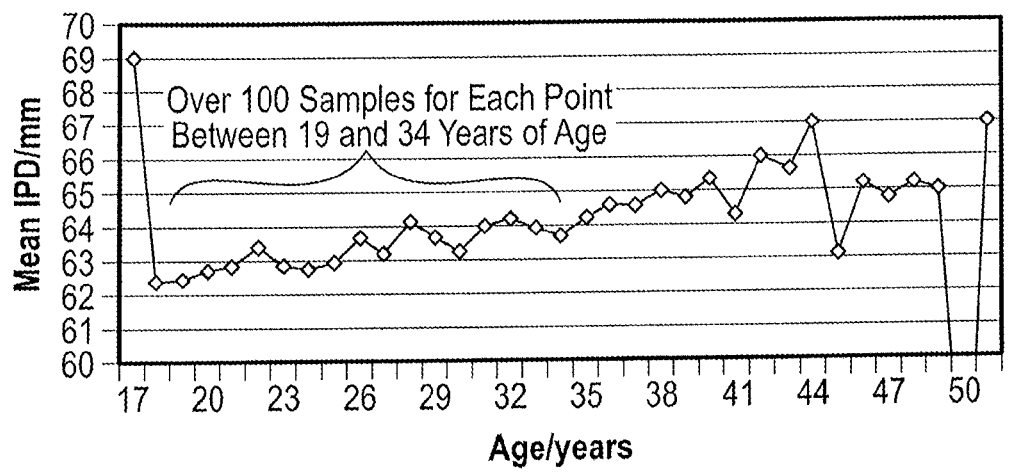
FIGS. 17A and 17B depict illustrative information in accordance with the principles of the invention.
Figure 17B:
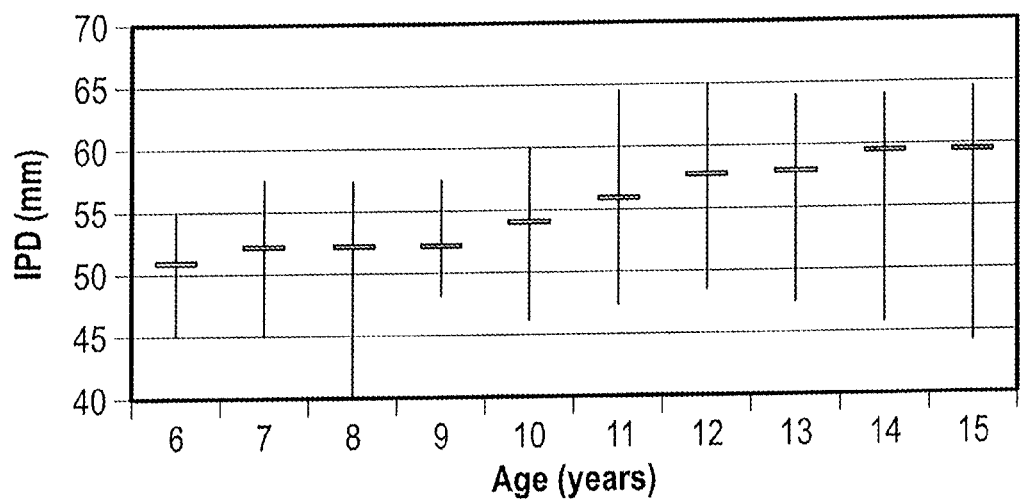

Children have substantially smaller pupil distances than adults as shown in the table in FIG. 17B. The mean pupillary distance for a 6 year old child is 51 mm, whereas a 14 year old has a pupillary distance mean of about 59 mm.

The short horizontal bars show, for each age, the mean pupil distance (mm) for females and the vertical bars show, for each age, the range of pupil distances, with the bottom of the horizontal bar corresponding to the 25th percentile and the top of the horizontal bar corresponding to the 75th percentile.

Thus, for example, when apparatus 1411 analyzes the image of the person received from the camera and determines that the person has a pupil distance of 51 millimeters, it may determine that the person is 6 years old. It may, however, also or instead, determine that the person may be 7-15 years old since 51 mm is in the range of ages 6-15. However, the apparatus 1411 may choose the single age where the mean pupil distance of such age is closest to the person in the image. Moreover, even if the apparatus 1411 determines a range of possible ages, it may only select ages where the pupil distance of the person is within a certain distance of the mean distance for a respective age. For example, apparatus 1411 may only determine that the person may be of a particular age if the person's pupil distance is within 1 (or 2, 3, 4, 5, 6, 7, 8, 9 or 10) mm of the mean pupil distance for that age.

In the alternative, apparatus 1411 may only determine that the person may be of a particular age if such person is within 1 (or 2, 3, 4, 5, or 6) standard deviations from the mean for a particular age. For example, if the mean for age 6 is 51 mm and the standard deviation is 2 mm, the apparatus 1411 would determine the person in the image to be 6 years old if his or her pupil distance is 49-53 mm.

Although FIGS. 17A-17B show mean pupil distance by age, other characteristics may be stored in the memory of apparatus 1411. For example, apparatus 1411 may store and use in its age determination, other factors such as race, gender, height, skin pigmentation, skin tone, head breadth, speech pattern, and the like. Thus, for example, if the average male 6 year old has a pupil distance of 52 and the average female 6 year old has a pupil distance of 51, that is taken into account if gender is determined, when determining age. In that scenario, if the pupil distance of the person is determined to be 51, the person may be determined to be a 6 year old female. It should be noted that these features may also be used in the age and/or gender determinations. For example, eye shape and size may vary depending on age, gender, and/or ethnicity.

The apparatus may also determine gender and age by using a microphone to determine speech patterns of the person. For example, apparatus 1411 may determine or estimate the person's age based on delay between words. Generally, delay between words is higher in younger persons. Thus, for example, a 5 year old would have longer delays between words than a 20 year old. The apparatus may determine gender based on intonation, tone, pitch (e.g., frequency), timber, concatenation, word frequency per time duration. For example, the mean frequency for a female's voice is much higher than that of a male (at times almost 70% higher, with 200 Hz being the female average and 120 Hz being the male average).

Additionally, speech or voice may be recognized and converted in text and that text may then be analyzed to determine complexity of words used and/or sentence structure. For example, acoustic modeling and language modeling may be utilized to determine an age, ethnicity or gender. Additionally, speech or voice may be utilized to ascertain the identity of the individual and provide access to a secure location, such as a military base.

In another example, a formula may be used, such as 206.835−1.015 (total words/total sentences)−84.6 (total syllables/total words). A lower score determined based on such formula indicates that the person is likely older. For example, apparatus 1411 would determine a score of 90-100 to be an 11 year old. The apparatus would determine a score of 60-70 to be a 14 year old, and a score of 0-30 to be an 18 year old. Thus, a user may be provided with a series of sentences/passages to read, and may be scored based on those passages, ultimately allowing an age determination based off of these results.

Either or both of apparatus 1409 and 1411 may include the camera, or may be the camera. The camera may also be separate from both apparatus 1409 and 1411. The camera is used to perform liveliness detection, facial age determination, approximate weight determination, ethnicity, race, color, mood, gender or any other suitable attribute detection or combination thereof. Either of apparatus 1409 or apparatus 1411 may perform one or both of the features of the other apparatus. For example, apparatus 1409 may perform facial age determination and liveliness detection. In a further example, apparatus 1411 may perform facial age determination and liveliness detection.

Age determination may be performed using geometric ratios of a face and skin wrinkle analysis. Using a database of determined ratios of a face, and skin wrinkle analysis and determination for each age group, an estimated age may be determined.

Age detection may be accomplished using any suitable or known methods of age detection or estimation. Age detection may be used to determine an estimated age of the user. The age may be estimated using the image of the user. The image may be analyzed for certain facial features that are used to predict an individual's age.

The data collection component may collect facial information that corresponds to one or more features of a human face. Exemplary features may include eyes, ears, nose, mouth or any suitable facial feature. Unique identifiers that may further aid in facial recognition, such as blemishes, scars, beauty marks or complexion may also be collected. Additional features may include facial measurements and/or dimensions, such as circularity, squareness or bone structure. Additional features may include the facial contour, facial features, bone structure, skin condition, wrinkles, skin aging, skin color, facial lines, muscle density, or craniofacial shape.

The data collection component, made up of facial age determination collection component 1411 and liveliness data collection component 1409, may collect one or more inputs. The inputs may be feature inputs. The feature inputs may correspond to one or more facial features. For example, an input may be a blemish. In a further example, an input may be the shape of a nose.

One or more of the feature inputs may correspond to an indicator. One or more of the feature inputs may correspond to an age indicator.

The age estimator 1421 may output an age. The age may be an estimated age. The age may be an estimated age of the human associated with a face. The age may be estimated based on the facial image information. The facial image information may be received by the processing component. The estimated age of the human face may be calculated, by the processing component 1425, based on facial image information collected by the data collection component.

The processing component 1425 may compare the determined estimated age to a threshold age. The threshold age may be a default age set by an administrator of the application.

The threshold age may be provided by an administrator. The threshold age may be customized by an individual or entity with authorization to customize the threshold age for one or more devices, applications or programs.

The processing component 1425 may compare the estimated age to the threshold age to determine if the estimated age is greater than the threshold age. The estimated age may be compared to the threshold age to determine if the estimated age is less than the threshold age. The estimated age may be compared to the threshold age to determine if the estimated age is equal to the threshold age.

The processing component may transmit an instruction to the device or application to grant permission to access the resource if the estimated age is greater than the threshold age. The processing component may transmit an instruction to the device to deny permission to access the resource if the estimated age is less than the threshold age.

If the processing component determines that the estimated age is equal to the threshold age, the processing component may transmit an instruction to the device to grant permission to access a resource. If the processing component determines that the estimated age is equal to the threshold age, the processing component may transmit an instruction to a device to deny permission to access the resource.

The processing component may cause the device to grant or deny permission. The processing component may transmit an instruction to grant access permission. The processing component may transmit an instruction to unlock one or more features. The processing component may transmit an instruction deny access permission. The processing component may transmit an instruction to lock or restrict access to one or more features.

Gender determination may be accomplished using several approaches. First, face shape description may be analyzed and characterized as either male, female or undetermined. Second, eye, ear and nose location may be characterized as either male, female or undetermined.

Weight may be estimated using certain facial features, such as analysis of bone structure and skin/fat presence on top of bone, and extrapolating a percentage of the fat presence on the face to that of the entire body. Further, presence of multiple chin lines and facial creases may be utilized.

Device 1403 may be operated by human 1431. Device 1403 may be configured to not be operated by a human, and may be in communication with one or more servers or additional computing devices. Thus device 1403 may be located on a wall, and control access to a door or facility. Upon detecting user 1431, device 1403 may receive instructions from a server to initiate a liveliness test and age determination. Device 1403 may also receive any customized parameters from the server, such as error rates and age thresholds.

Device 1403 may attempt to determine the estimated age of human' 1431 face using determination apparatus 1411. Apparatus 1411 may capture an image of human's 1431 face. The image may be a first image in a sequence of images.

Device 1403 may attempt to detect the liveliness of human 1431 using liveliness detection apparatus 1409. Apparatus 1409 may capture an image of human's 1431 face. The image may be a second image in a sequence of images. Liveliness may be captured using the features and steps as discussed above in reference to FIGS. 4-6.

In another embodiment, device 1403 may determine gender of human 1431 using determination apparatus 1411. Age or gender may be determined using pupil distance, hair length, jaw structure, facial structure, cheek structure or any additional suitable features or facial landmarks, such as the location and shape of eyes, nose, mouth, ears, forehead or chin, whether relative to one another, or in any other suitable calculation. It should be noted that some or all of the determinations may be used for fraud detection. For example, while age detection and verification may be the primary goal of the process to grant access, gender, smile score, error margin, or any other suitable attribute, may be used to aid in fraud detection.

Device 1403 may transmit one or more images captured via the internet 1433. Device 1403 may transmit data corresponding to one or more of the captured images via the internet 1433.

The images or data may be transmitted from device 1403 to a processor. The processor may be located within device 1405. Device 1405 may be a server, processor, multiple processors, or any suitable combination of computing devices. Device 1405 may be one computing device located in one geographic location. Device 1405 may be a plurality of computing devices dispersed at different geographic locations.

Device 1405 may include apparatus 1421. Apparatus 1421 may be an age estimator or any other suitable attribute estimator. Apparatus 1421 may be a processor. Estimator 1421 may process information received by apparatus 1411, such as facial age or gender.

Estimator 1421 may process an image captured by apparatus 1411. Estimator 1421 may determine an estimated age. The estimated age may be an estimate of the age of human 1431, as captured by apparatus 1411. Estimator 1421 may determine a gender or any other suitable attribute.

Estimator 1421 may transmit the estimated information to be stored in memory. Estimator 1421 may transmit the estimated information to data array 1413. The estimated information may be represented in array 1413 by data field 1415. Data field 1417 may be filled with any additional suitable data.

Device 1405 may include liveliness indicator 1423. Indicator 1423 may be a processor. Indicator 1423 may process liveliness detection information received by apparatus 1409.

Indicator 1423 may process an image captured by, or received from, apparatus 1409 and/or 1411.

Indicator 1423 may determine if the image or images captured by device 1403 is an image or a set of images of a live human. Indicator 1423 may make this determination using information received from apparatus 1409. The information may be a pose or a series of poses, or background information such as the presence or lack of a bezel, frame or border. Further, the frame may be detected based the presence of anything square or rectangle shaped around the edges of the face, as well as anything in the line of the eyes or horizontally shaped. The determination may be performed using some or all of the steps from processes discussed above in reference to FIGS. 4-7. The information may include biometric information.

Indicator 1423 may determine the liveliness of human 1431. Indicator 1423 may determine that there is liveliness, there is not liveliness, or liveliness is inconclusive, as discussed. A liveliness score may also be determined after step 425, or after step 509. Additionally, liveliness may be determined using one of the following types of results as discussed above: (a) Null result; (b) Pass result; (c) Fail result; and (d) could not process result. Indicator 1423 may transmit the determination to be stored in memory 1413. Indicator 1423 may transmit the determination to data array 1413.

Device 1405 may include permission processor 1425.

Processor 1425 may receive age or any other suitable information from data array 1413. The age information may be transmitted to processor 1425 from age estimator 1421.

Processor 1425 may receive liveliness information from data array 1413. The liveliness information may be transmitted to processor 1425 from liveliness indicator 1423.

Processor 1425 may determine whether to grant or deny access permission, based on the steps mentioned above in reference to FIGS. 4-7, and/or based on a determination of (a) Null result; (b) Pass result; (c) Fail result; and (d) could not process result. The access permission may be granted or denied to human 1431. The access permission may provide human 1431 access, such as access to resources on device 1403, or access to a location or feature controlled by device 1403. The access permission may deny human 1431 the ability to access resources on device 1403.

For example, processor 1425 may receive the estimated age from data array 1413. Processor 1425 may receive information about the threshold age. Processor 1425 may also receive the threshold age from data array 1413. Processor 1425 may determine that the estimated age is less than the threshold age. Processor 1425 may determine that the estimated age is greater than the threshold age.

Processor 1425 may receive liveliness information from data array 1413. Processor 1425 may determine that there is no indication of liveliness. Processor 1425 may determine that liveliness is present.

Processor 1425 may transmit instruction 1427 to grant permission to access resources on device 1403, based on satisfaction of phases one, two and three as discussed above. Processor 1425 may transmit instruction 1429 to deny permission to access resources on device 1403.

The user information, which the tool is intended to prevent collection of without adequate verification, may include personal information, economic information, health information, location information, family information and any other suitable information.

The estimated age may include an age category. For example, the invention may classify humans into different age ranges, such as "under 6," "ages 6-12," "ages 13-18," or any other suitable age range. In another example, humans may be classified into different age categories representing approximate ages, such as young child, toddler, infant, preschooler, child, preteen, tween, teenager, young adult, middle age, senior citizen, or any other suitable age category. In yet another example, humans may be classified with both an age range, such age 6-12, and an age category, such as child. The method may include determining liveliness from the input data.

The processing component may determine an estimated age based on the one or more age-indicators. The processing component may transmit the estimated age to the data collection component.

The estimated age may be determined from optical data, such as stored photographs. The optical data may include first image data. The optical data may include second image data.

Apparatus 1411 may include a data collection component. The apparatus 1411 may include a processor. Some or all of the methods, or portions thereof, may be performed by the processor. Some or all of the methods, or portions thereof, may be performed by the data collection component. Data and information may be exchanged between the processor and the data collection component to perform the methods or portions thereof.

Access may include interaction with a resource. Access may include communication with a resource. Access may include transmission of data to or from a resource. Access may include exchange of information with a resource. The user of suitable age may be a parent, legal guardian, a child of suitable age, or any other suitable adult or human accompanying the user and exceeding the age threshold, falling below an age threshold (when the threshold is a maximum age), or falling within an age range. The parent, legal guardian or adult may interact with the tool included as a part of a system to provide permission for another user, such as a child user.

The system may include a facial recognition device. The facial recognition device may be utilized to determine the estimated age of the user. The estimated age may then be compared to a threshold age that has been set. If the age meets or exceeds the threshold age, or is otherwise sufficient, the user may be granted permission to access the resource. If the age falls below the threshold age, the user may be denied permission to access the resource.

The system may include one or more liveliness indicators. Each liveliness indicator may be utilized individually, or in combination with one another. The liveliness indicator device may be utilized to determine if the user is a live user. The user may be classified with a positive liveliness indicator or a negative liveliness indicator. The user may be granted permission to access the resource only upon meeting or exceeding the threshold age and classification of a positive liveliness indicator.

Alternatively, the threshold age may be a maximum threshold age. That is, a user may be required to be below a predetermined age to access the resource. Therefore, the user may be granted permission to access the resource upon being below the threshold age and including a classification with a positive liveliness indicator, and the user may be denied permission to access the resource upon being above the threshold age and/or including a negative liveliness indicator. In the alternative, the user may be granted permission to access the resource upon being within a pre-determined, or dynamically determined, age range.

The liveliness indicator may run a liveliness test. The liveliness test may include one or more steps for verifying liveliness. The liveliness test determines if there is a live face, and may determine if the face is a human face based on one or more features unique to human faces (for example, pupil distance, mouth landmarks, cheekbone location). The liveliness test may determine head movement or turning, lack of movement, or excessive movement. For example, if the head moves more than 3 inches in one direction or greater than 30 degrees, or any other suitable measurements. The liveliness test may determine smiling expressions or any other suitable expression.

For example, the screen may display a message to the person requesting that he or she smile for the liveliness test. The apparatus 1411 may then take, store and analyze an image of the person to determine whether the person is in fact smiling. In another example, smiling may be evaluated by focusing on the mouth of the person and noting whether the left end and right end of the mouth are a certain distance above the middle of the mouth. The apparatus 1411 may also determine whether the image shows a depression (i.e., wrinkles) on the outer edges of eyes. The apparatus may also determine whether the image shows a depression at the left end and right end of the mouth (i.e., dimples).

The liveliness indicator may include another layer/requirement to demonstrate sufficient liveliness. For example, another liveliness indicator may include prompting a user to input a randomly generated activation code. In another example, a user may be required to input a signature. The signature may be input by a parent or user, and may be input simultaneously with the first liveliness test.

The data collection component and the processing component may be distributed geographically. The data collection component and the processing component may be located within separate devices, or within the same device. It will be understood that the processing component may include a series of multiple processors located in multiple geographic locations.

The tool as operated within the system may be operable in conjunction with an operating system, a mobile operating system, software, an application or "app", browser or hardware.

The data collection component may use facial recognition as a security feature or barrier to prevent or allow access to the device. The data collection component may use facial recognition as a security feature or barrier to prevent or allow access to an application or resource within the device.

The data may be collected from a face in a first configuration. For example, the data may be collected from a facial pose or expression. The pose may be a frown. Exemplary facial configurations or expressions are included in Table 2 below.

TABLE 2

| | | | |
|---|---|---|---|
| Smile | Frown | Angry | Happy |
| Sad | Disgust | Surprised | Fear |
| Content | Embarrassed | Nervous | Suspicious |
| Annoyed | Bored | Tired | Exhausted |
| Grumpy | Laughing | Excited | Confused |
| Stoic | Blink | Shock | Raised eyebrow |

The data may be collected from a face in a second configuration. For example, the second configuration may be a smile. The second configuration may include any of the facial configurations enumerated in Table 2, above. The second configuration may be a different pose from the first configuration. It should be noted that the invention contemplates the use of facial recognition for either one facial configuration or multiple facial configurations.

The data collection component may prompt the user for a sequence of motions or poses. The user may be prompted while the data collection component is operating the facial recognition process. The sequence may be captured using a still camera shot. The sequence may be captured using a video segment of the human. The user may be prompted to move in a sequence, or conduct a number of poses. The sequence or pose types may not be revealed to the user until the initiation of the liveliness test and may be randomly generated, as discussed.

The first facial configuration may be used to ascertain or determine the age of the face. The first facial configuration may be used to determine the liveliness, vitality, activity or vivacity of the human associated with the face. The second facial configuration may be used to ascertain or determine the age of the face. The second facial configuration may be used to determine the liveliness, vitality, activity or vivacity of the human associated with the face. It should be noted that the first facial configuration and second facial configuration may be interchangeable in their use and function.

For example, data from a first facial configuration may be transmitted to the processing component. The processing component may utilize facial recognition process or software to determine an estimated age of the human associated with the face.

In a further example, data from a second facial configuration may be transmitted to the processing component. The processing component may determine that the facial expression is that of a live human. The processing component may make a determination whether the second facial expression differs from the first. The processing component may determine if a predetermined threshold amount of movement has occurred between first and second images. Thus, if more than the predetermined threshold movement has occurred, the images may be flagged as non-live images, and may be categorized as lacking liveliness.

In yet a further example, data from the second facial configuration may be transmitted to a plurality of processing components. Each of the processing components may be managed by a different third party, and each may transmit an estimated age. The estimated age received from the multiple third parties may be used to determine a final estimated age. For example, a first third-party may provide an estimated age of 25 and a second third-party may provide an estimated age of 29. The processing component may average the two provided estimated ages for a final estimated age of 27. In the alternative, the processing component may choose the higher age or the lower age or may choose a range that begins at one standard deviation below the average and ends at one standard deviation above the average.

The processing component may include a liveliness indicator. The liveliness indicator may be used to determine the liveliness of a user. This may prevent a user from engaging in fraudulent or deceitful activity to bypass the age threshold barrier. For example, the data collection unit may attempt to collect an image of the user. To bypass the security feature, the user may attempt to utilize or present a pre-taken photograph or pre-recorded video of a person of a particular age. The photograph or video may be a photograph or video of a person whose age would be greater than the age threshold. For example, the facial features of a parent or grandparent would indicate a certain age, such as an older age, and therefore satisfy the age threshold. The video or photograph may be categorized as pre-recorded or pre-taken based on any suitable method. For example, a video may be categorized as pre-recorded by detecting whether a captured image displays a screen frame or bezel around the video.

A user may attempt to bypass an age requirement by utilizing glasses, which often make an individual appear older. Therefore, the system may determine if a user is wearing glasses, such as whether anything is present around detected eyes (e.g., within the horizontal line of eyes), and request that the user remove the glasses in order to proceed and determine an accurate estimated age of the user. The system may also determine if the user is wearing one or more additional items that tend to make an individual appear older, such as a cap.

The data collection component may collect liveliness information. The liveliness information may be transmitted to the processing component to determine if a live individual of proper age is the one attempting to access the resource.

The liveliness indicator may be used to determine if the image received by the data collection component is an image of a live user.

The liveliness indicator may be configured to classify a face into one of several classifications. The liveliness indicator may utilize facial image information collected via the data collection component to classify the face.

The liveliness indicator may classify a face with a positive liveliness indicator. The positive liveliness indicator may indicate the presence of liveliness.

The liveliness indicator may classify a face with a negative liveliness indicator. The negative liveliness indicator may indicate a lack of liveliness. The negative liveliness indicator may indicate an inconclusive result, such as an inability to determine liveliness.

The liveliness indicator may utilize methods to classify a user as a live individual attempting to access the resource. Liveliness indicators may include motion detection processes, as discussed previously. Motion detection may include one or more bodily movements or motions to indicate liveliness. Motion detection processes may include the use of one or more of infrared detection, optics, sound, vibration or other suitable forms of motion detection. The motion detection processes may be used as a liveliness indicator. For example, a user may be prompted to "wave a hand" and then "turn sideways."

The motion detection process may be used to determine that liveliness is not present. For example, when a device for detecting liveliness, such as a smartphone or computer, is abruptly moved, or the user abruptly moves back and forth, liveliness may not be present. Alternatively, the process may determine that liveliness is inconclusive, due to the attempt of a child attempting to move the device to a screen or picture to attempt to present liveliness.

The system may transmit information from the data collection component. The information may be transmitted to the processing component.

The processing component may be used to analyze the information from the data collection component. The processing component may process facial recognition information.

The processing component may receive one or more indicators from the data collection component. The indicators may be collected from facial recognition information. The indicators may include one or more age-indicators, gender identifiers or any other suitable indicators. The indicators may be from a first facial configuration, second facial configuration, signature requirements, swipes or touches, or any other suitable indicator.

The processing component may then transmit this information to be recorded on a server associated with the system. The server may record and store the information, and link back to the user inputting the information for additional liveliness verification.

The processing component may transmit the estimated age to the device. The device may be configured to display the estimated age on a device screen. The device may be configured to display the estimated age within an application on the device. The processing component may transmit the estimated age to an administrator of the resource.

The system may be configured to set a flag, which may be a digital watermark, identifier, or any other suitable indicator. The flag may be a permission flag. The permission flag may be set based on an estimated age.

The system may be configured to set the flag to deny permission. The flag may be set to deny permission if any feature falls below or above a threshold. For example, permission may be denied if the age of a user of the user is below a threshold. The threshold may be a predetermined threshold. The threshold may be an age threshold. In another example, permission may be denied if the age of a user is above a threshold.

The age threshold may be customized by a user. The age threshold may be preset within an application or device. The age threshold may be modified. Modification of the age threshold may only be allowed by a user with proper modification credentials, such as an administrator.

The system may be configured to set the flag to grant permission. The flag may be set to grant permission if the age of a user is not below a threshold. The flag may be set to grant permission if the age of a user is above a threshold.

Facial recognition analysis may be accomplished using any suitable or known methods of facial recognition. For example, a digital image of a user may be analyzed. The analysis may determine the identity of the user. The digital image may be compared to a database of users. Facial recognition may be used to detect the age of the user.

The device may include an application. The application may be launched by tapping a touch screen icon, activating a physical control such as a button, or clicked on. A user may attempt to open or initiate the application. When access to the application is attempted, the application may instruct the camera to initiate a facial recognition sequence.

When access to the application is attempted, the application may instruct the user that, in order to proceed, facial recognition is required. The application may ask the user if the user wishes to proceed. If the user accepts or indicates a wish to proceed, the application may initiate use of the camera. The application may utilize the camera within the application. The application may utilize the generic camera application on the device. The application may then utilize the photograph captured by the camera.

The application may use the camera to capture an image of the user. The application may use the camera to capture a series of sequential user images.

One or more of the images may be analyzed. The application may analyze the image to determine the estimated age of the user.

The application may be pre-programmed with facial recognition software. The application may utilize the facial recognition to determine the estimated age of the user.

The application may transmit the image to a processing component to analyze the image.

The application may analyze one or more of the images to determine liveliness. The application may compare the sequential images and search for indicators of change. For example, minute changes in facial muscles may be sufficient to indicate that the user has utilized a live image, and not a pre-captured photograph.

Alternatively, the device may include other biometric sensors, such as an infrared camera or sensor. Any suitable biometric tests may be used to analyze liveliness, such as an iris scanner, pupil scanner, pulse scanner, or any other suitable indicator.

Exemplary lockout/timeout sequence to prevent access may include locking out the user from the application for a predetermined or pre-specified period of time. The user may be locked out based on a denial of access. The user may be locked out based on failing the liveliness test. The user may be locked out based on failing the age estimation test. Alternatively, the application may only lock out a user after a predetermined number of unsuccessful attempts.

An application may be customized to lock out a user only after a predetermined number of unsuccessful attempts. For example, if a user is denied permission on a first attempt, this may be an unintentional result of a lack of liveliness (e.g., the user did not see the instruction, or just decided not to move), although liveliness may be present. Allowing a second attempt may rectify this.

The application may receive facial recognition information. The application may receive liveliness information. The facial recognition information may be transmitted to a remote node. The liveliness information may be transmitted to a remote node, such as the web portal.

At the remote node, the facial recognition information and the liveliness information may be analyzed. The remote node may output a report. The report may be based on the analysis of the facial recognition and the liveliness information. The report may be transmitted to the application.

The application may process the report. The application may use the report to determine to grant permission to a user. The application may use the report to determine to deny permission to a user. The report may be processed at the remote node.

The processing of the report may output an instruction. The instruction may be transmitted to the application. The instruction may be an instruction to grant permission to a user. The instruction may be an instruction to deny permission to a user.

Figure 15:
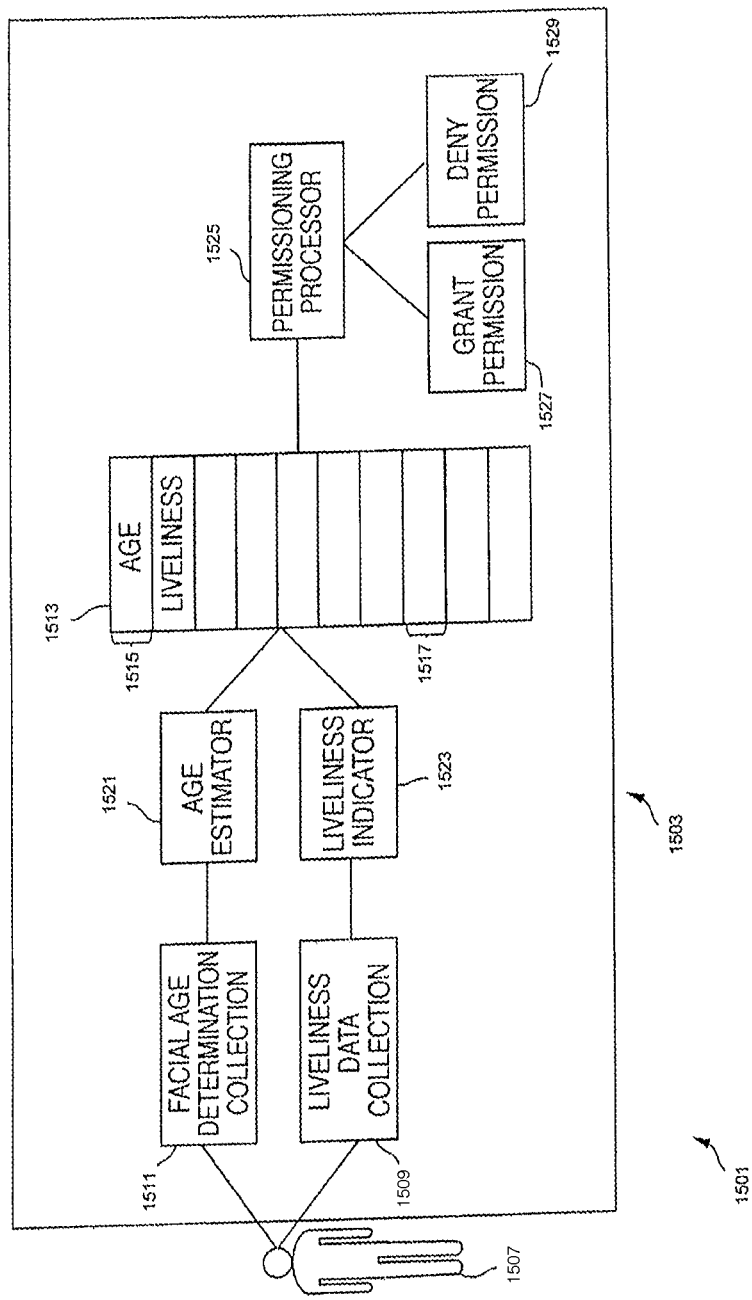

FIG. 15 illustrates another embodiment of the inventive device.

System 1501 may include device 1503. Device 1503 may be a computing device. Device 1503 may be identical to device 1403, including liveliness detection apparatus 1509 and facial characteristics determination apparatus 1511. Each of apparatuses 1509 and 1511 may be identical to apparatus 1409 and 1411, respectively.

Device 1503 may be operated by human 1507. Device 1503 may attempt to determine the facial age of human 1507 using determination apparatus 1511. Apparatus 1511 may capture an image of human 1507's face. The image may be a first image in a sequence of images.

Device 1503 may attempt to detect the liveliness of human 1507 using liveliness detection apparatus 1509. Apparatus 1509 may capture an image of human 1507's face. The image may be a second image in a sequence of images.

Device 1503 may transmit one or more images captured. Device 1503 may transmit data corresponding to one or more of the images captured.

The images or data may be transmitted to one or more processors, such as age estimator 1521 and liveliness indicator 1523.

Age estimator 1521 may process facial age determination information received from apparatus 1511.

Estimator 1521 may process an image received from apparatus 1511. Estimator 1521 may determine an estimated age. The estimated age may be an estimate of the age of human 1507, as captured by apparatus 1511.

Estimator 1521 may transmit the estimated age to be stored in memory. Estimator 1521 may transmit the estimated age to data array 1513. The estimated age may be represented in memory that stores the data array 1513 by data field 1515. Data field 1517 may be filled with any additional suitable data.

Liveliness indicator 1523 may process liveliness detection information received from apparatus 1509.

Indicator 1523 may process an image received from apparatus 1509.

Indicator 1523 may determine if the image captured by device 1503 is an image of a live human. Indicator 1523 may make this determination using information received by apparatus 1509. The information may be a pose. The information may be biometric information.

Indicator 1523 may determine the liveliness of human 1507. Indicator 1523 may determine that there is liveliness, there is not liveliness, or liveliness is inconclusive. Indicator 1523 may transmit the determination to be stored in memory. Indicator 1523 may transmit the determination to data array 1513.

Device 1503 may include permission processor 1525.

Processor 1525 may receive age information from memory 1513. The age information may be transmitted to processor 1525 from age estimator 1521.

Processor 1525 may receive liveliness information from data array 1513. The liveliness information may be transmitted to processor 1525 from liveliness indicator 1523.

Processor 1525 may determine whether to grant or deny access permission. The access permission to access a device may be granted or denied to human 1507. The access permission may allow human 1507 to access resources on device 1503. The access permission may deny human 1507 the ability to access resources on device 1503.

Processor 1525 may process the age and liveliness information received. Based on the age and liveliness information, processor 1525 may decide to grant permission. Based on the age and liveliness information, processor 1525 may decide to deny permission.

For example, processor 1525 may receive the estimated age from data array 1513. Processor 1525 may receive information about the threshold age. Processor 1525 may also receive the threshold age from data array 1513. Processor 1525 may determine that the estimated age is less than the threshold age. Processor 1525 may determine that the estimated age is greater than the threshold age.

Processor 1525 may receive liveliness information from memory 1513. Processor 1525 may determine that there is no indication of liveliness. Processor 1525 may determine that liveliness is present.

Processor 1525 may transmit instruction 1527 to grant permission to access a resource on device 1503. Processor 1525 may transmit instruction 1529 to deny permission to access the resource on device 1503.

Figure 16:
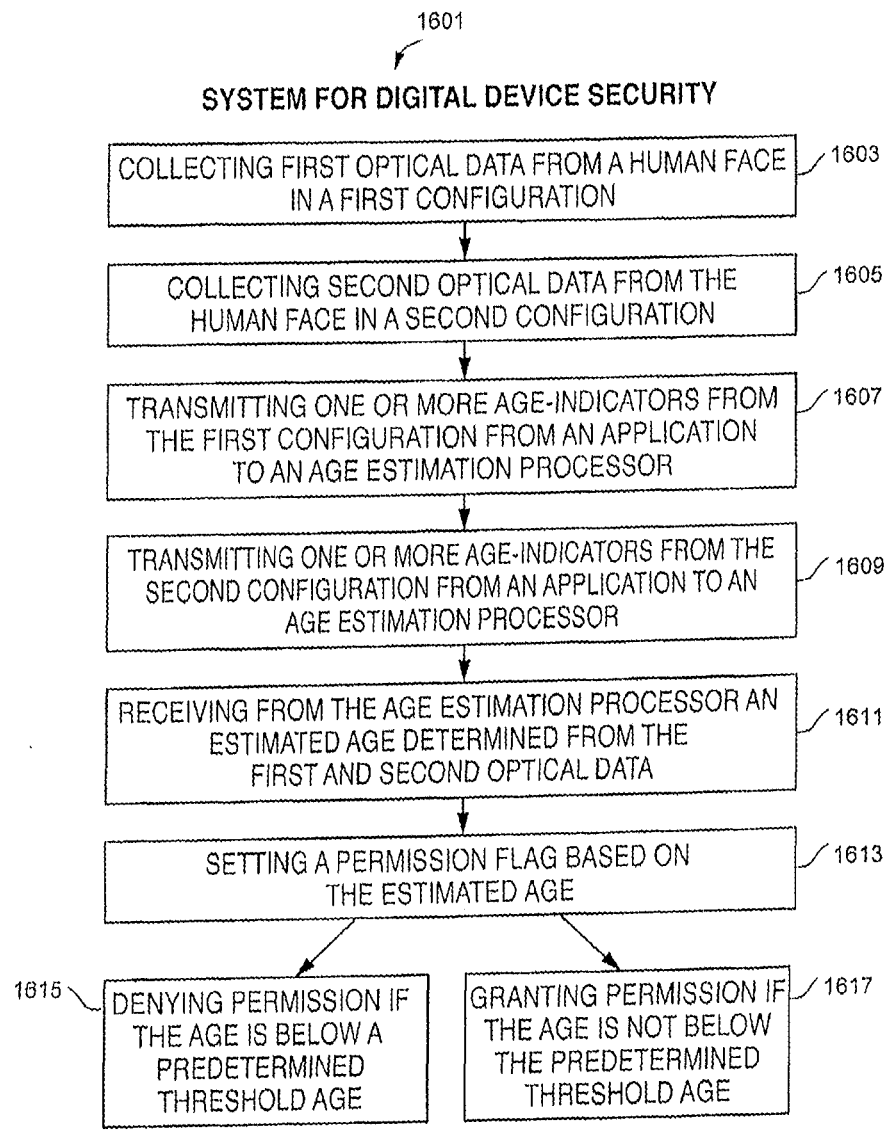

FIG. 16 shows illustrative process 1601, which is a process flow for performing a resource permissioning analysis in accordance with the invention. Process 1601 may begin at step 1603.

At step 1603, the system may collect data. The data may be optical data. The optical data may be first image data. The data may be optical data from a human face. The human face may be in a first configuration. Processing performed with respect to the first configuration may correspond to the sequence of FIG. 4, above, describing the first phase of the sequence.

At step 1605, the system may collect second image data. The second image data may be optical data from a human face. The human face may be in a second configuration. Processing performed with respect to the second configuration may correspond to the sequence of FIG. 5, above, describing the second phase of the process.

At step 1607, the system may transmit one or more measurements and results of processing with respect to the first and second configurations.

For example, a first image may be processed locally (such as within the device) to determine the presence or lack of liveliness, and a second image may be transmitted to a third party or off-site server to determine age information. The first image may be compared to the second image, all of which may be done locally, to determine whether the first image and second image are of the same person.

The age indicators may be transmitted from an application to a processor. The application may transmit the age indicators to the processor. The processor may be an age estimation processor.

At step 1609, the system may transmit one or more age indicators. The age indicators may be from the second image corresponding to the second configuration. The age indicators may be transmitted from an application. The application may transmit the age indicators to a processor. The processor may be an age estimation processor.

At step 1611, the system may receive an estimated age. The estimated age may be received from the age estimation processor. The estimated age may be determined from the first and second image data. The system may also receive one or more predetermined features and thresholds, and may analyze the results of steps 1603 and 1605. This may correspond to the sequence of FIG. 6, above, describing the third phase of the process.

At step 1613, the system may set a flag. The flag may be a permission flag. The permission flag may be based on the estimated age.

At step 1615, the system may deny permission. Permission may be denied if the age is below a threshold. The threshold may be a predetermined threshold age.

At step 1617, the system may grant permission. Permission may be granted if the age is not below a predetermined threshold age.

In an exemplary embodiment, once a flag is set to grant permission, the system may generate a permission code. The permission code may be a multi-use or one-time use code. The code may be used to bypass a liveness and verification process in additional applications or functions. For example, once a user receives a flag granting permission in a first device or application, the user flag may be used in additional devices or features in communication with the first device or application. When the user attempts to login to a second device or application, the user may input the generated permission code, and would be recognized as a pre-permissioned user. The second device would then receive data from the first device. That is, the system would provide an auto-generated permission code in combination with a front-end verification system utilizing facial detection and liveness detection.

As discussed herein, one or more of the image capture device, display, memory, transmitter, receiver permissioning device and liveness device may be controlled by a CPU, processor and/or microcontroller.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

What is claimed is:

1. An information processing apparatus comprising:
an image capture device for capturing a plurality of images of a user;
a memory storing at least one data array including pupil distance in correspondence with age information;
a processor configured to generate a random facial pose;
a transmitter configured to transmit instructions to the user, including an instruction to pose for the image capture device in a first facial configuration for capturing a first image and to pose in a second facial configuration for capturing a second image, wherein the first facial configuration is different than the second facial configuration, and one of the first and second facial configurations corresponds to the randomly generated facial pose;
a receiver configured to receive facial image information based on the plurality of images captured by the image capture apparatus, said facial image information comprising:
the first image of the user;
the second image of the user; and
one or more feature inputs corresponding to one or more facial features, wherein at least one of the one or more of the feature inputs corresponds to an age-indicator;
wherein the processor determines, based on the facial image information:
a positive detection of an image of the user's full face in the first and second images;
whether the pose of the user in first image corresponds to the first facial configuration and the pose of the user in the second image corresponds to the second facial configuration;
whether the pose corresponding to the first facial configuration was maintained for a first predetermined amount of time; and
whether the pose corresponding to the second facial configuration was maintained for a second predetermined amount of time.

2. The apparatus of claim 1, wherein:
the processor determines, based on the facial image information, whether the user is a live user, and
the processor determines, based on the facial image information and the data array stored in the memory, an estimated age of the user by:
determining a first pupil location;
determining a second pupil location;
determining the distance between the first pupil location and the second location; and
comparing the distance determined to a plurality of age values stored in the memory.

3. The apparatus of claim 2, wherein the processor is further configured to determine if the estimated age is greater than, lesser than, or equal to a predetermined age threshold.

4. The apparatus of claim 1, wherein the first facial configuration corresponds to a non-smiling pose and the second facial configuration corresponds to the randomly generated pose.

5. The apparatus of claim 1, wherein the processor is further configured to:
determine, based on the facial image information, whether the user is a live user and set a flag in association with the first and second images of the user's face indicating one of:
a positive liveliness indicator; and
a negative liveliness indicator;
receive an estimated age of the user in the first and second images; and
grant or deny access to one or more resources, wherein:
upon receipt of an estimated age that satisfies a predetermined age threshold, and if the flag set by the processor is the positive liveliness indicator, the processor grants access to the one or more resources;
upon receipt of an estimated age that does not satisfy the predetermined age threshold, the processor denies access to the one or more resources; and
if the flag set by the processor is a negative liveliness indicator, the processor denies access to the one or more resources.

6. The apparatus of claim 1, wherein the first predetermined amount of time is different than the second predetermined amount of time, the second predetermined amount of time being shorter than the first predetermined amount of time.

7. The apparatus of claim 1, wherein, if the processor determines that the pose corresponding to the first facial configuration was not maintained for the first predetermined amount of time, or that the pose for the second facial configuration was not maintained for the second predetermined amount of time, the processor is further configured to initiate an error sequence.

8. The apparatus of claim 7, wherein the error sequence initiation includes the processor further configured to change an activation code prompt for the user, the activation code being configured to not be displayed to the user if the error sequence is initiated.

9. The apparatus of claim 1, wherein, if the processor does not determine a positive detection of the image of the user's full face in the first and second images, or that the pose of the user in first image corresponds to the first facial configuration and the pose of the user in the second image corresponds to the second facial configuration, the processor is further configured to initiate an error sequence.

10. An information processing apparatus comprising:
an image capture apparatus for capturing a plurality of images of a user;

a processor implementing the following steps:
- randomly generating a facial pose from a plurality of facial poses;
- instructing the user to pose for the image capture apparatus using a first facial pose for capturing a first image and using a second facial pose different from the first facial pose for capturing a second image, wherein one of the first and second poses corresponds to the randomly generated facial pose;
- acquiring, from the image capture apparatus, the first and second images of the user captured by the image capture apparatus; and
- determining, by performing a facial recognition analysis, whether the user in the first and second images is a live user, and determining one or more facial characteristics of the user based on at least one of the first and second images,
- wherein the facial recognition analysis includes:
  - determining whether the pose of the user in the first image corresponds to the first facial pose and whether the pose of the user in the second image corresponds to the second facial pose;
  - determining whether the first and second images include at least a predetermined portion of the user's face;
  - determining whether the user maintained the first facial pose for a first predetermined amount of time determining whether the user maintained the second facial pose for a second predetermined amount of time, the second predetermined amount of time shorter than the first predetermined amount of time;
  - detecting movement of the user at the time of capturing both the first image and second image; and
  - determining whether detected movement of the user is greater than a predetermined amount of allowed movement.

11. The apparatus of claim 10, wherein the plurality of images of the user include one or more of video images and still images.

12. The apparatus of claim 10, wherein the determined facial characteristics include one or more of age and gender.

13. The apparatus of claim 10, wherein the determining the facial characteristics of the user comprises determining whether the user satisfies an age threshold, and the processor is further configured to implement the steps of:
- setting a first flag in association with the user, based on the determination of whether the user is a live user, the first flag being one of a positive liveliness indicator and a negative liveliness indicator;
- setting a second flag in association with the user, based on the determination of whether the user satisfies the age threshold, the second flag being one of a pass age threshold flag and a fail age threshold flag;
- granting access to a resource when the first flag associated with the user is a positive liveliness indicator and the second flag associated with the user is the pass age threshold flag; and
- denying access to a resource when at least one of: the first flag associated with the user is the negative liveliness indicator and the second flag associated with the user is the fail age threshold flag.

14. The apparatus of claim 10, wherein the processor determines one or more facial characteristics of the user only after determining that the user in the first and second images is a live user.

15. The apparatus of claim 10, wherein the processor determines one or more facial characteristics of the user concurrently with determining whether the user in the first and second images is a live user.

16. The apparatus of claim 10, wherein the processor is configured to detect a pupil distance of the user in at least one of the first and second images, and wherein the one or more facial characteristics of the user are determined based on the detected pupil distance.

17. A system for authenticating access to a device, the system comprising:
- a transmitter configured to transmit an instruction to a user to provide a first specified pose for a first image and a second specified pose for a second image, the pose for the first image different than the pose for the second image;
- a receiver configured to receive images from an image capture apparatus, the images including the first image and the second image;
- a memory storing at least one data array including age information and gender information, the age information including a first predetermined age threshold corresponding to a first gender for accessing the device, and a second predetermined age threshold corresponding to a second gender for accessing the device;
- a processor configured to: compare the first image to the first specified pose and the second image to the second specified pose; determine whether the pose of the user in the first image corresponds to the first specified pose and the pose of the user in the second image corresponds to the second specified pose; determine whether the user maintained the first specified pose for a first predetermined amount of time; determine whether the user maintained the second specified pose for a second predetermined amount of time;
- determine an estimated age of the user based on one or more of the first image and the second image;
- determine a gender of the user;
- determine, based on the predetermined age threshold stored in the memory corresponding to the determined gender of the user, whether the estimated age satisfies the predetermined age threshold for the user's determined gender;
- determine if the user is a live user based on the first and second images of the user; and
- if it is determined that the user's estimated age satisfies the predetermined age threshold for the user's determined gender, and that the user is a live user, set a flag to grant permission to access the device.

18. The system of claim 17, the determination of whether the user is a live user including:
- the processor further configured to generate a random pose, wherein one of the first specified pose and the second specified pose corresponds to the randomly-generated pose.

19. The system of claim 17, wherein if it is determined that the user's estimated age does not satisfy the predetermined age threshold for the determined gender of the user, or that the user is not a live user, the processor is further configured to set a flag to deny permission to access the device.

* * * * *